(12) United States Patent
Takano

(10) Patent No.: US 11,975,542 B2
(45) Date of Patent: May 7, 2024

(54) LIQUID ABSORBER AND PRINTING APPARATUS

(71) Applicant: SEIKO EPSON CORPORATION, Tokyo (JP)

(72) Inventor: Hidehiro Takano, Nagano (JP)

(73) Assignee: Seiko Epson Corporation, Tokyo (JP)

(*) Notice: Subject to any disclaimer, the term of this patent is extended or adjusted under 35 U.S.C. 154(b) by 119 days.

(21) Appl. No.: 17/664,890

(22) Filed: May 25, 2022

(65) Prior Publication Data

US 2022/0379618 A1 Dec. 1, 2022

(30) Foreign Application Priority Data

May 27, 2021 (JP) .................... 2021-089069

(51) Int. Cl.
*B41J 2/17* (2006.01)
*B32B 27/00* (2006.01)
*B41J 2/165* (2006.01)

(52) U.S. Cl.
CPC ... *B41J 2/16517* (2013.01); *B32B 2307/3065* (2013.01)

(58) Field of Classification Search
CPC ....................................... B41J 2/1721
See application file for complete search history.

(56) References Cited

U.S. PATENT DOCUMENTS

| | | | | |
|---|---|---|---|---|
| 2007/0014960 A1* | 1/2007 | Emanuel | ............ | B32B 5/022 442/154 |
| 2008/0318025 A1* | 12/2008 | Kurokawa | ............ | B41J 2/1721 428/319.3 |
| 2011/0045312 A1* | 2/2011 | Diminick | ............ | B32B 5/024 428/513 |
| 2014/0267492 A1* | 9/2014 | Takano | ............ | B41J 2/16532 347/31 |
| 2019/0291393 A1* | 9/2019 | Solenicki | ............ | B32B 27/32 |

FOREIGN PATENT DOCUMENTS

JP H08-311755 A 11/1996

* cited by examiner

*Primary Examiner* — Shelby L Fidler
(74) *Attorney, Agent, or Firm* — Global IP Counselors, LLP

(57) ABSTRACT

A liquid absorber of the present disclosure includes: a first base material; a second base material; and an absorption layer provided between the first base material and the second base material, in which the first base material and the second base material both contain a flame-retardant filament non-woven fabric, and a content of a flame retardant in the absorption layer is less than 10% by mass.

11 Claims, 11 Drawing Sheets

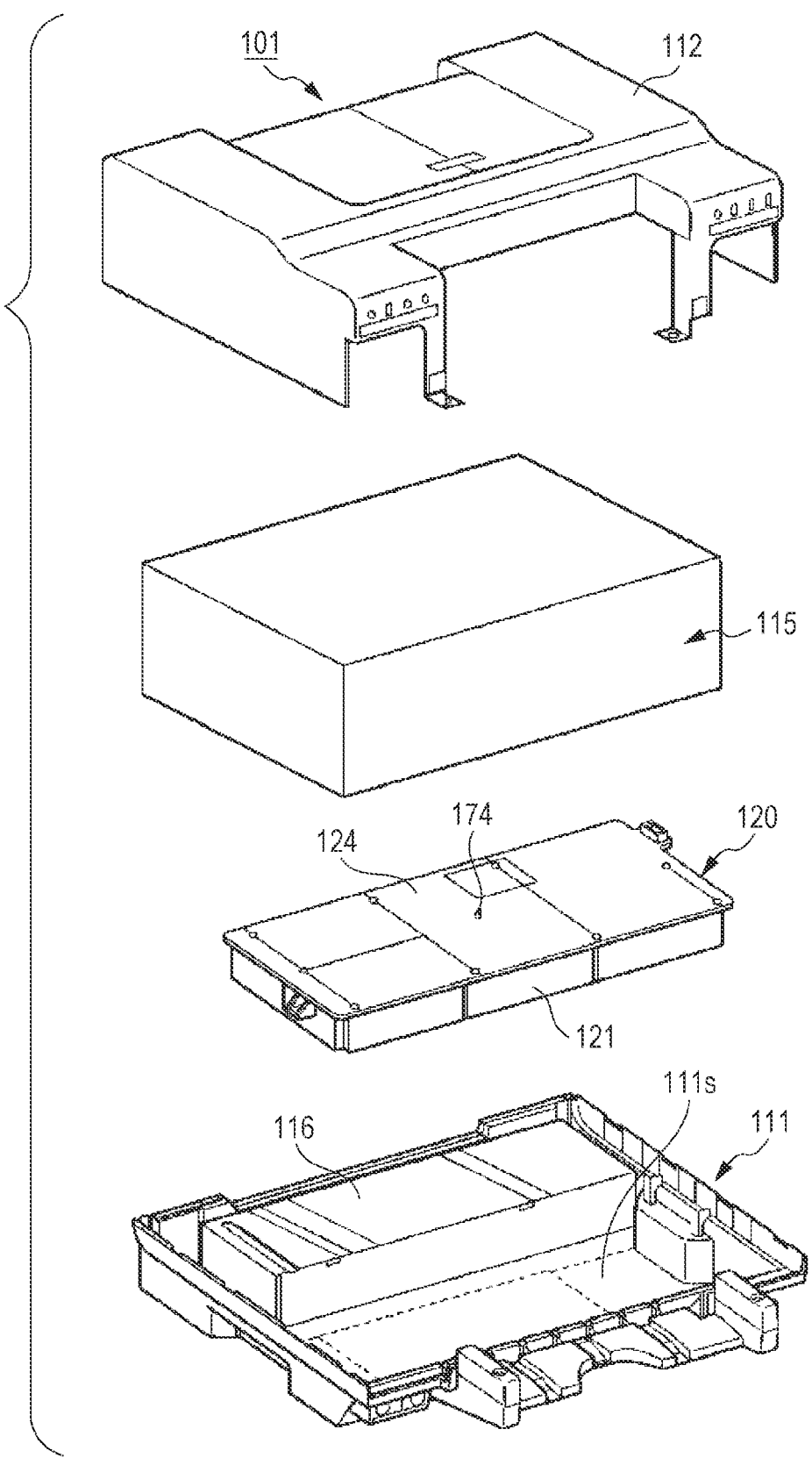

LIQUID ABSORBER AND PRINTING APPARATUS

The present application is based on, and claims priority from JP Application Serial Number 2021-089069, filed May 27, 2021, the disclosure of which is hereby incorporated by reference herein in its entirety.

BACKGROUND

1. Technical Field

The present disclosure relates to a liquid absorber and a printing apparatus.

2. Related Art

In the ink jet printer, waste ink is generated during a head cleaning operation normally performed to prevent a decrease in print quality due to clogging of the ink, or an ink filling operation after replacing an ink cartridge. Therefore, in order to prevent such waste ink from being attached undesirably to a mechanism or the like inside the printer, a liquid absorber that absorbs the waste ink is provided.

The liquid absorber that collects a waste liquid of ink needs to ensure flame retardancy for the safety of the printer. Therefore, a flame retardant is added to the liquid absorber.

In the related art, as a liquid absorber, for example, a liquid absorber has been used in which a natural cellulose fiber and/or synthetic fiber, a heat-fusible substance, and a flame-retardant substance are mixed and unwoven in air to form a mat, the mat is further heated to a melting point of the heat-fusible substance or higher, and thereafter the flame-retardant substance is fixed in a web by being compressed by a press roll (for example, refer to JP-A-8-311755).

The flame retardant added to the liquid absorber is usually formed of a component that does not easily react with ink, which is a liquid to be absorbed, and does not easily form aggregates.

However, the ink staying in the ink tank for a long period of time is deteriorated due to air oxidation, the flame retardant may thus react with the deteriorated ink, causing aggregation, so that an absorption performance of the ink is hardly maintained for a long period of time, which was problematic.

SUMMARY

The present disclosure can be realized in the following aspects.

According to an aspect of the present disclosure, a liquid absorber includes: a first base material; a second base material; and an absorption layer provided between the first base material and the second base material, in which the first base material and the second base material both contain a flame-retardant filament nonwoven fabric, and a content of a flame retardant in the absorption layer is less than 10% by mass.

Further, according to another aspect in the present disclosure, a printing apparatus includes the liquid absorber according to the aspect in the present disclosure.

BRIEF DESCRIPTION OF THE DRAWINGS

FIGS. 8A to 8C are cross-sectional views illustrating an opening/closing operation of an opening/closing valve illustrated in FIG. 6, in which FIG. 8A is a cross-sectional view illustrating the opening/closing valve being closed, FIG. 8B is a cross-sectional view illustrating the opening/closing valve being opened due to an increase in pressure in a storage space of waste ink by introduction of the waste ink, and FIG. 8C is a cross-sectional view illustrating the opening/closing valve being closed again after the introduction of the waste ink is completed.

FIG. 9 is an exploded perspective view schematically illustrating an overall configuration of the ink jet printer which is a printing apparatus.

DESCRIPTION OF EXEMPLARY EMBODIMENTS

Hereinafter, preferred embodiments in the present disclosure will be described in detail.

1. Liquid Absorber

First, a liquid absorber of the present disclosure will be described.

Figure 1:
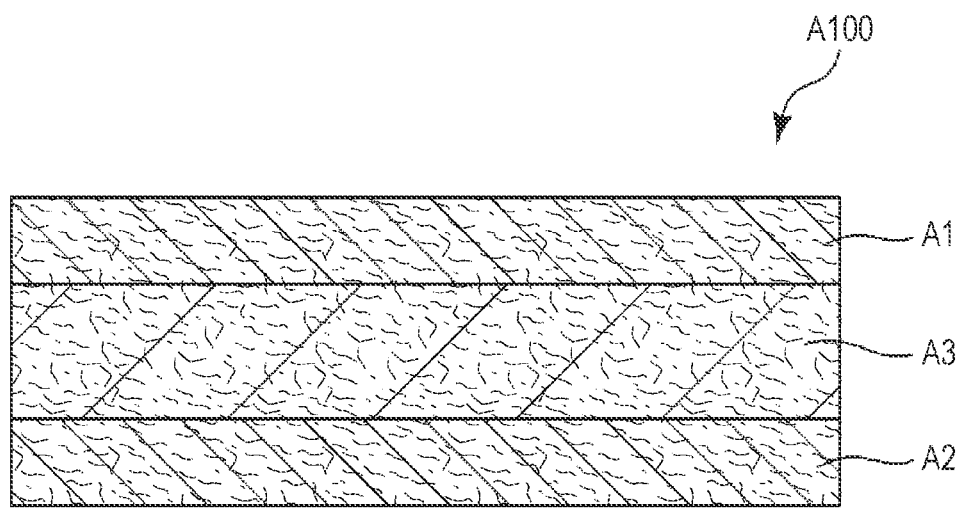
FIG. 1 is a vertical sectional view schematically illustrating a preferred embodiment of a liquid absorber in the present disclosure.

FIG. 1 is a vertical sectional view schematically illustrating a preferred embodiment of a liquid absorber in the present disclosure. The drawings referred to in the present specification illustrate parts of components in an exaggerated state and do not accurately reflect the actual dimension thereof.

A liquid absorber A100 includes a first base material A1, a second base material A2, and an absorption layer A3 provided between the first base material A1 and the second base material A2. In other words, the liquid absorber A100 has a structure in which the first base material A1, the absorption layer A3, and the second base material A2 are stacked in this order.

The first base material A1 and the second base material A2 both contain a flame-retardant filament nonwoven fabric, and a content of a flame retardant in the absorption layer A3 is less than 10% by mass.

With such a configuration, for example, when the liquid absorber A100 has excellent flame retardancy and comes into contact with an acidic liquid, and more specifically, even when the liquid coming into contact with the liquid absorber A100 has acidity due to air oxidation or the like, it is possible to provide the liquid absorber A100 capable of effectively preventing generation of aggregates and stably improving a liquid absorption performance for a long period of time. In addition, when the liquid absorber A100 has a little use frequency, even if an overall amount of liquid absorption is small, it is possible to effectively prevent occurrence of a problem such as a significant decrease in liquid absorption performance after a predetermined period of time has elapsed since the liquid starts to be absorbed.

Obtaining such an excellent effect is considered for the following reasons. That is, the liquid absorber in the related art contains the flame retardant at a portion that mainly absorbs and retains the liquid in the liquid absorber. Generally, the flame retardant used in the related art is sparingly soluble, but is slightly soluble in a liquid such as water. For example, when ink is left to be absorbed for a long period of time in such a liquid absorber in the related art, the dissolved flame retardant reacts with the ink to form aggregates and impairing an absorption performance of the liquid absorber. In addition, the ink staying in the waste liquid tank for a long period of time is denatured by air oxidation, temperature, and the like, pH and a functional material contained in the ink are changed, and the ink starts to exhibit chemical properties different from the original ink. As a result, the reaction with the flame retardant is easy to proceed, and the above problem occurs more prominently. Meanwhile, in the liquid absorber A100 according to the present disclosure, the first base material A1 and the second base material A2 both contain a flame-retardant filament nonwoven fabric, and a content of a flame retardant in the absorption layer A3 is less than 10% by mass. In other words, in the liquid absorber A100 according to the present disclosure, portions that mainly exhibit flame retardancy, that is, the first base material A1 and the second base material A2 are separated from the portion that mainly absorbs and retains the liquid, that is, the absorption layer A3. As described above, since the portions that mainly exhibit flame retardancy are separated from the portion that mainly absorbs and retains the liquid, it is possible to effectively prevent the first base material A1 and the second base material A2, which are the portions that mainly exhibit flame retardancy, from coming into contact with the liquid and the flame retardant for a long period of time. Also, since generation of aggregates near a surface of the liquid absorber A100 is effectively prevented, it is possible to suitably supply and hold the liquid near the center of the liquid absorber A100. Further, the first base material A1 and the second base material A2 contain a filament nonwoven fabric, and it is thus possible to effectively prevent undesirable falling-off of the fibers even when a basis weight thereof is reduced as compared with the first base material A1 and the second base material A2 formed of a staple fiber. Therefore, the first base material A1 and the second base material A2 can have particularly excellent liquid permeability, the liquid can be effectively supplied by the absorption layer A3, and it is possible to effectively prevent the first base material A1 and the second base material A2 from coming into contact with the liquid and the flame retardant for a long period of time. As described above, the liquid absorber A100 according to the present disclosure can effectively prevent the generation of aggregates due to a liquid such as ink for a long period of time.

1-1. First Base Material

The first base material A1 sandwiches the absorption layer A3 together with the second base material A2.

The first base material A1 contains a flame-retardant filament nonwoven fabric.

The first base material A1 usually has a sheet shape.

Examples of the filament nonwoven fabric include a spunbonded nonwoven fabric, a melt-blown nonwoven fabric, and a spun lace nonwoven fabric, but and the spunbonded nonwoven fabric is preferable.

As a result, a filament nonwoven fabric having fibers with the same thickness and basis weight can be obtained, thereby reducing an absorption rate and unevenness of flame retardancy from the first base material A1.

The flame-retardant filament nonwoven fabric constituting the first base material A1 may contain fibers formed of a polymer containing a flame-retardant monomer component.

As a result, flame retardancy of the fiber itself contained in the first base material A1 can be improved, and the undesirable falling-off of the flame-retardant component from the fiber can be prevented more effectively.

When the flame-retardant filament nonwoven fabric constituting the first base material A1 contains fibers formed of a polymer containing a flame-retardant monomer component, examples of the flame-retardant monomer component include a phosphorus-containing compound, a halogen-containing compound, and a nitrogen-containing compound, but the phosphorus-containing compound is preferable in terms of easy control of polymerization reaction.

Accordingly, flame retardancy of the liquid absorber A100 can be further improved.

Examples of the phosphorus-containing compound as the flame-retardant monomer component include a compound having a phosphaphenanthrene ring, and more specifically, [(6-oxo-6H-dibenz[c,e][1,2]oxoxan-6-yl)methyl]butanedioate bis(2-hydroxyethyl)ester, and phosphaphenanthrene-modified benzyl alcohol.

When the flame-retardant filament nonwoven fabric constituting the first base material A1 contains fibers formed of a polymer containing a flame-retardant monomer component, examples of a main skeleton of the polymer include a polyester skeleton and a polyolefin skeleton, but the polyester skeleton is preferable.

The flame-retardant filament nonwoven fabric constituting the first base material A1 may be obtained by applying a flame retardant onto a surface of the filament nonwoven fabric.

As a result, for example, various commercially available filament nonwoven fabrics can be used as a parent material, and a content of the flame retardant, a thickness of a portion containing the flame retardant, and the like can be suitably adjusted by adjusting a coating liquid composition, viscosity, or the like.

When the flame-retardant filament nonwoven fabric constituting the first base material A1 is obtained by applying the flame retardant onto the surface of the filament nonwoven fabric as a parent material, the flame-retardant filament nonwoven fabric can be suitably manufactured by applying a solution of the flame retardant or a dispersion onto the filament nonwoven fabric as a parent material, and then removing the solvent or dispersion.

The flame-retardant filament nonwoven fabric constituting the first base material A1 may be obtained by molding a kneaded product containing a resin material and the flame retardant.

Accordingly, for example, conditions such as a blending ratio of the resin material and the flame retardant and a width of fibers can be more preferably adjusted. Moreover, flame retardancy of the fiber itself contained in the first base material A1 can be improved, and the undesirable falling-off of the flame-retardant component from the fiber can be prevented more effectively.

When the flame-retardant filament nonwoven fabric constituting the first base material A1 is obtained by molding a kneaded product containing the resin material and the flame retardant, examples of the resin material contained in the kneaded product include those as follows. That is, examples of the resin material contained in the kneaded product include polyolefins such as polyethylene and polypropylene, polyester, a synthetic resin of polyamide, and natural resin fibers such as cellulose, keratin, and fibroin, and these can be used in combination of one or more kinds thereof. However, polyester is particularly preferable.

An example of the flame retardant include a tautomeric compound, and the compound that has a tautomer with a hydroxyl group can be preferably used.

As a result, when the liquid that comes into contact with the liquid absorber A100 contains water, the liquid absorption performance can be stably improved for a long period of time.

Examples of tautomerism include keto-enol tautomerism, amide-imidic acid tautomerism, lactam-lactim tautomerism, nitroso-oxime tautomerism, nitro-acidinitro tautomerism, and nuclear tautomerism, valance tautomerism, and ring-chain tautomerism.

Specific examples of the tautomeric compound include cyanuric acid, triazine analogs, organophosphorus compounds with phosphorus-oxygen bonds, specifically 9,10-dihydro-9-oxa-10-phosphaphenanthrene-10-oxide, and 10-(2,5-dihydroxyphenyl)-10-H-9-oxa-10-phosphaphenanthrene-10-oxide.

The tautomeric compound preferably contains a nitrogen atom in the molecule.

A nitrogen element is an element that can directly contribute to the formation of hydrogen bonds and is also advantageous for improving flame retardancy. Therefore, the effect described above is remarkably exhibited.

As the flame retardant having tautomerism, for example, melamine cyanurate may be used. Melamine cyanurate is a mixture containing cyanuric acid, which is a tautomeric compound, and melamine, which is a nontautomeric compound. Cyanuric acid has a structure containing three hydroxyl groups, and isocyanuric acid, which is a compound obtained by substituting the hydroxyl group with a carbonyl group by tautomerism, forms a multiple hydrogen bond with melamine in the mixture. With such a structure, melamine cyanurate extremely hardly reacts with the deteriorated ink, and it is thus considered that the effect described above is remarkably exhibited. As a result, the effect described above is more effectively exhibited.

The flame retardant may be a compound other than the tautomeric compound.

Examples of the compound other than the tautomeric compound include hydrate metal salt compounds such as aluminum hydroxide, aluminum carbonate, magnesium hydroxide, magnesium carbonate, huntite, hydromagnesite, calcium hydroxide, calcium carbonate, zinc sulfate, dihydrate gypsum, calcium aluminate, dawsonite, and kaolin clay; amino and/or ammonium group-containing phosphoric acid compounds such as ammonium polyphosphate, guanidine phosphate, melamine polyphosphate, and guanylurea phosphate; a nitrogen-phosphorus flame retardant in which an amino and/or ammonium group-containing compound is added to the phosphoric acid compound; melamine; a phosphazene derivative; boric acid compounds such as $Na_2B_4O_7/10H_2O$; and a highly water-absorptive resin such as cross-linked sodium polyacrylate, and these can be used in combination of one or more kinds thereof. Examples of commercially available products of the highly water-absorptive resin such as crosslinked sodium polyacrylate include AQUALIC manufactured by NIPPON SHOKUBAI CO., LTD., DIAWET manufactured by MITSUBISHI CHEMICAL CORPORATION, ARONZAP manufactured by TOAGOSEI CO., LTD., AQUALON GP manufactured by Nippon Synthetic Chemical Industry Co., Ltd., SUMIKAGEL manufactured by Sumitomo Chemical Co., Ltd., SANWET manufactured by SANYO CHEMICAL INDUSTRIES, Ltd., Arasorb manufactured by Arakawa Chemical Industries, Ltd., Drytech manufactured by Dow Chemical Company, Favor manufactured by Stockhausen, BELL OASIS manufactured by Kanebo, Ltd., and Fibersorb manufactured by Camelot.

When the flame-retardant contains the tautomeric compound and the compound other than the nontautomeric compound, a ratio of the tautomeric compound to the flame retardant is preferably 20.0% by mass or more, more preferably 30.0% by mass or more, and still more preferably 40.0% by mass or more and 99.0% by mass or less.

However, in the present specification, a flame-retardant component refers to the above-described flame-retardant monomer component or flame retardant.

An average width of the fibers constituting the flame-retardant filament nonwoven fabric is not particularly limited, but preferably 0.5 μm or more and 200.0 μm or less, and more preferably 1.0 μm or more and 100.0 μm or less.

The first base material A1 may contain a composition other than the flame-retardant filament nonwoven fabric. Examples of such a composition include a binder that binds the fibers to each other.

For example, a heat-fusible resin, which will be described later in 1-3-2., can be used as a binder.

However, a content of components other than the flame-retardant filament nonwoven fabric in the first base material A1 is preferably 10.0% by mass or less, more preferably 7.0% by mass or less, and still more preferably 5.0% by mass or less.

A basis weight of the first base material A1 is not particularly limited, but preferably 5.0 g/m$^2$ or more and 70.0 g/m$^2$ or less, more preferably 7.0 g/m$^2$ or more and 60.0 g/m$^2$ or less, and still more preferably 10.0 g/m$^2$ or more and 50.0 g/m$^2$ or less.

As a result, the liquid permeability of the first base material A1 can be improved, and shape stability, durability, and the like of the liquid absorber A100 can be improved.

A thickness of the first base material A1 is preferably 0.01 mm or more and 3 mm or less, and more preferably 0.05 mm or more and 1 mm or less.

As a result, the liquid permeability of the first base material A1 can be improved, and shape stability, durability, and the like of the liquid absorber A100 can be improved. Moreover, an amount of liquid that can be absorbed per unit volume of the liquid absorber A100 can be increased while suppressing an increase in manufacturing costs of the liquid absorber A100.

1-2. Second Base Material

The second base material A2 sandwiches the absorption layer A3 together with the first base material A1.

The second base material A2 contains a flame-retardant filament nonwoven fabric.

The second base material A2 usually has a sheet shape.

The second base material A2 may have liquid permeability, but usually contains fibers.

The second base material A2 preferably satisfies the same conditions as described in 1-1. above, but the first base material A1 and the second base material A2 may have the same conditions or different conditions.

1-3. Absorption Layer

The absorption layer A3 is provided between the first base material A1 and the second base material A2, and is a portion that mainly contributes to absorption of the liquid.

A content of the flame retardant in the absorption layer A3 is less than 10% by mass. As described above, when the content of the flame retardant in the absorption layer A3 is sufficiently small, it is possible to stably prevent the generation of aggregates when the liquid comes into contact with the liquid absorber A100 for a long period of time.

As described above, the content of the flame retardant in the absorption layer A3 may be less than 10% by mass, but preferably less than 7% by mass, more preferably less than 4% by mass, and still more preferably less than 2% by mass.

As a result, the effect of the present disclosure as described above is remarkably exhibited.

1-3-1. Fiber

The absorption layer A3 may be formed of any material as long as it has a function of absorbing the liquid, but preferably contains fibers.

As a result, the liquid can be absorbed more efficiently due to a capillary phenomenon, and the liquid can be more suitably retained in the absorption layer A3.

Examples of the fibers constituting the absorption layer A3 include polyolefin fibers such as polyethylene fibers and polypropylene fibers, synthetic resin fibers such as polyester fibers and polyamide fibers, and natural resin fibers such as cellulose fibers, keratin fibers, and fibroin fibers. Further, these fibers may be introduced with a chemical structure that imparts flame retardancy, such as a phosphaphenanthrene ring. Among these, cellulose fibers are particularly preferable.

Since the cellulose fiber is a hydrophilic material, when a liquid containing water is added to the liquid absorber A100 for example, the cellulose fiber shows affinity with the liquid, and the liquid can be thus suitably retained. In addition, the cellulose fiber is a renewable natural material and is inexpensive and easily available among various fibers, which is advantageous in terms of reduction in production costs, stable production, reduction in environmental load, and the like.

In the present specification, the cellulose fiber may be a fibrous material containing cellulose as a compound as a main component, and may contain, for example, hemicellulose and lignin in addition to cellulose.

Examples of the cellulose fiber include wood pulp for papermaking such as chemical pulp or mechanical pulp prepared from coniferous tree and/or broadleaf tree, used paper pulp, linter, and other non-wood plant fibers prepared from hemp, cotton, kenaf, and the like.

An average length of the fibers constituting the absorption layer A3 is not particularly limited, but preferably 0.1 mm or more and 50 mm or less, more preferably 0.5 mm or more and 30 mm or less, and still more preferably 1.0 mm or more and 5.0 mm or less.

As a result, an ability of the absorption layer A3 to absorb and retain the liquid can be further improved. Moreover, as the fibers constituting the absorption layer A3, a fibrillated product such as used paper can be suitably used, which is advantageous in terms of reduction in production costs of the liquid absorber A100, reuse of resources, and the like.

An average width of the fibers constituting the absorption layer A3 is not particularly limited, but preferably 0.5 μm or more and 200.0 μm or less, and more preferably 1.0 μm or more and 100.0 μm or less.

A content of the fibers in the absorption layer A3 is preferably 65.0% by mass or more and 99.0% by mass or less, more preferably 72.0% by mass or more and 98.0% by mass or less, and still more preferably 78.0% by mass or more and 97.0% by mass or less.

As a result, a stable liquid absorption performance of the liquid absorber A100 for a long period of time can be further improved. It is also advantageous in terms of reduction in manufacturing costs of the liquid absorber A100.

1-3-2. Heat-Fusible Resin

The absorption layer A3 may contain a heat-fusible resin.

Accordingly, constituent materials of the absorption layer A3, for example, the fibers described above can be suitably bonded, for example, the constituent materials of the absorption layer A3 can be suitably prevented from undesirably falling off from the liquid absorber A100, and shape stability of the liquid absorber A100 can be further improved. In particular, even when short fibers are used as fibers constituting the absorption layer A3, the effect described above can be obtained. Therefore, as the fibers constituting the absorption layer A3, a fibrillated product such as used paper can be suitably used, which is advantageous in terms of reduction in production costs of the liquid absorber A100, reuse of resources, and the like.

Examples of the heat-fusible resin include polyolefin resins such as polyethylene, polypropylene, polyvinyl acetate, ethylene/vinyl acetate copolymer, and polyvinyl alcohol; polyamide; polyester; and polyurethane.

For example, the heat-fusible resin may have a plurality of regions formed of different materials. More specifically, for example, the heat-fusible resin may have a structure in which a base portion formed of a material having a high melting point of about 160° C., such as polypropylene, is coated with a coating layer formed of a material having a low melting point of about 130° C., such as polyethylene. With such a structure, for example, an outer coating layer is melted or softened, and the base portion is heated to a temperature at which it is not melted or softened in manufacturing of the liquid absorber A100. Thus, only the coating layer can be melted or softened, productivity of the liquid absorber A100 can be particularly improved, and the shape stability of the liquid absorber A100 can be particularly improved.

A content of the heat-fusible resin in the absorption layer A3 is preferably 1.0% by mass or more and 30.0% by mass or less, more preferably 2.0% by mass or more and 25.0% by mass or less, and still more preferably 3.0% by mass or more and 20.0% by mass or less.

Accordingly, the content of the fibers can thus be sufficiently increased while fully exhibiting the effect obtained by containing the heat-fusible resin, and a stable liquid absorption performance of the liquid absorber A100 for a long period of time can be further improved. It is also advantageous in terms of reduction in manufacturing costs of the liquid absorber A100.

In particular, the absorption layer A3 preferably contains a cellulose fiber and a heat-fusible resin.

As a result, the effect described above is more effectively exhibited.

1-3-3. Flame Retardant

As described above, the absorption layer A3 may contain a flame retardant as long as a content of the flame retardant is sufficiently small, less than 10% by mass.

Accordingly, flame retardancy of the entire liquid absorber A100 can be further improved.

As the flame-retardant contained in the absorption layer A3, for example, those described in 1-1. can be used, but the absorption layer A3 may contain, for example, a hydroxide as the flame retardant.

Accordingly, flame retardancy of the entire liquid absorber A100 can be further improved, and even when the liquid is oxidized by air, the liquid absorbed by the absorption layer A3 can have a relatively high pH value, for example, a pH value from a neutral pH value to a basic pH value due to neutralization reaction with hydroxide, and the generation of aggregates can be effectively prevented.

When the absorption layer A3 contains a hydroxide as a flame retardant, the hydroxide preferably has low solubility in a liquid, such as aluminum hydroxide.

As a result, it is possible to more reliably prevent the outflow of hydroxide, and it is possible to more effectively prevent the liquid absorbed by the absorption layer A3 from being unnecessarily basic.

The flame-retardant contained in the absorption layer A3 may have any form, but is preferably in a form of powder. When the flame retardant is in a form of powder, an average particle diameter of the flame retardant is preferably 0.1 µm or more and 20.0 µm or less, and more preferably 1.0 µm or more and 10.0 µm or less.

In the present specification, the average particle diameter refers to an average particle diameter based on the volume. The average particle diameter can be determined by measurement using, for example, a particle diameter distribution measuring apparatus, such as LA910 manufactured by HORIBA, Ltd., using a laser diffraction/scattering method as a measuring principle, that is, a laser diffraction type particle diameter distribution measuring apparatus.

1-3-4. Other Components

The absorption layer A3 may contain components other than the above. Hereinafter, such components are also referred to as "other components". Examples of other components include a colorant, an aggregation inhibitor, a surfactant, a defoamer, a moisturizer, a preservative, a pH adjuster, an antistatic agent. Further, the absorption layer A3 may contain a resin material other than the heat-fusible resin such as a photocurable resin, a water-absorptive resin, and an ion-exchange resin as other components.

A content of other components in the absorption layer A3 is preferably 10.0% by mass or less, more preferably 7.0% by mass or less, and still more preferably 5.0% by mass or less.

1-3-5. Other Conditions

A basis weight of the absorption layer A3 is not particularly limited, but preferably 150 g/m$^2$ or more and 2,000 g/m$^2$ or less, and more preferably 500 g/m$^2$ or more and 1,000 g/m$^2$ or less.

As a result, an ability of the absorption layer A3 to absorb and retain the liquid can be further improved.

A thickness of the absorption layer A3 is preferably 2 mm or more and 50 mm or less, and more preferably 5 mm or more and 20 mm or less.

As a result, an amount of liquid that can be absorbed by the liquid absorber A100 can be further increased while sufficiently improving tractability of the liquid absorber A100.

1-4. Others

When the liquid absorber A100 contains a cellulose fiber, the liquid absorber A100 may contain a cellulose fiber derived from used paper. This can contribute to resource savings and energy savings, and is preferable in terms of environmental protection.

When the liquid absorber A100 contains a cellulose fiber, a ratio of the cellulose fiber derived from used paper to the entire cellulose fiber constituting the liquid absorber A100 is preferably 50% by mass or more and 100% by mass or less, and more preferably 80% by mass or more and 100% by mass or less. As a result, liquid absorbency of the entire liquid absorber A100 can be particularly improved while fully exhibiting the effect obtained by containing the cellulose fiber derived from the used paper as described above.

The liquid absorbed by the liquid absorber A100 preferably contains water.

When the liquid absorbed by the liquid absorber contains water, the problem due to the generation of aggregates as described above is particularly likely to occur. However, according to the present disclosure, even when the liquid absorbed by the liquid absorber contains water, it is possible to effectively prevent the above-described problem from occurring. That is, when the liquid absorbed by the liquid absorber A100 contains water, the effect of the present disclosure is remarkably exhibited. Further, versatility of the liquid absorber is further enhanced because the use of the liquid absorber relates to absorption of the liquid containing water in many cases.

When the liquid absorbed by the liquid absorber A100 contains water, a content of water in the liquid absorbed by the liquid absorber A100 is preferably 5% by mass or more and 97% by mass or less, more preferably 10% by mass or more and 95% by mass or less, still more preferably 20% by mass or more and 93% by mass or less, and most preferably 30% by mass or more and 90% by mass or less.

As a result, the above-described effect of the present disclosure is remarkably exhibited.

A solid content in the liquid absorbed by the liquid absorber A100 is preferably 2% by mass or more and 50% by mass or less, more preferably 3% by mass or more and 45% by mass or less, and still more preferably 5% by mass or more and 40% by mass or less.

As a result, the above-described effect of the present disclosure is remarkably exhibited.

The liquid absorber A100 may have the first base material A1, the second base material A2, and the absorption layer A3 as described above, and may have other configurations. For example, a joining layer may be provided between the first base material A1 and the absorption layer A3 or between the second base material A2 and the absorption layer A3 to join the first base material A1, the joining layer, and the absorption layer A3 or the second base material A2, the joining layer, and the absorption layer A3. In such a case, the joining layer may be formed of, for example, an adhesive. In addition, for example, the liquid absorber of the present disclosure may further have other base materials or other absorption layers, in addition to the above-described two base materials, that is, the first base material and the second base material, and at least one absorption layer provided between the first base material and the second base material. In other words, for example, the liquid absorber of the present disclosure has three or more base materials and two or more absorption layers, and may have a structure in which these base materials and absorption layers are alternately arranged.

A shape of the liquid absorber A100 is not particularly limited, but preferably has a sheet shape.

The liquid absorber of the present disclosure may be used alone or in plurality at the same time. More specifically, for example, a single liquid absorber A100 may be stored and used in a predetermined container, or a plurality of liquid absorbers A100 may be stored and used in a predetermined container.

When a plurality of liquid absorbers A100 are used at the same time, for example, a plurality of sheet-shaped liquid absorbers A100 may be stacked and used so as to have a predetermined positional relationship. Further, a plurality of small pieces of the liquid absorber A100 may be filled in a predetermined container and used.

The liquid absorber A100 may be used for any purpose as long as it is used for absorbing the liquid, but preferably used for absorbing ink.

Among the various liquids applicable to the liquid absorber, the ink is particularly difficult to maintain the absorption performance of the liquid absorber for a long period of time. On the other hand, in the present disclosure, even if the liquid absorber is used for absorbing ink, it is possible to effectively prevent the above-described problem from occurring. That is, when the liquid absorber is used for absorbing ink, the effect of the present disclosure is remarkably exhibited.

Examples of the ink include pigment ink containing a pigment, dye ink containing a dye, and clear ink containing no pigment and dye, but the liquid absorber A100 is preferably used for absorbing the pigment ink.

In the liquid absorber applied to the pigment ink in which pigment particles are dispersed among various inks, a gap of the liquid absorber is easily filled with agglomerates of the pigment due to change in pH, thus making it difficult to maintain the ink absorption performance for a long period of time. On the other hand, in the present disclosure, even if the liquid absorber is used for absorbing the pigment ink, it is possible to effectively prevent the above-described problem from occurring.

2. Method of Manufacturing Liquid Absorber

Next, a suitable manufacturing method of the liquid absorber A100 will be described.

Figure 2:
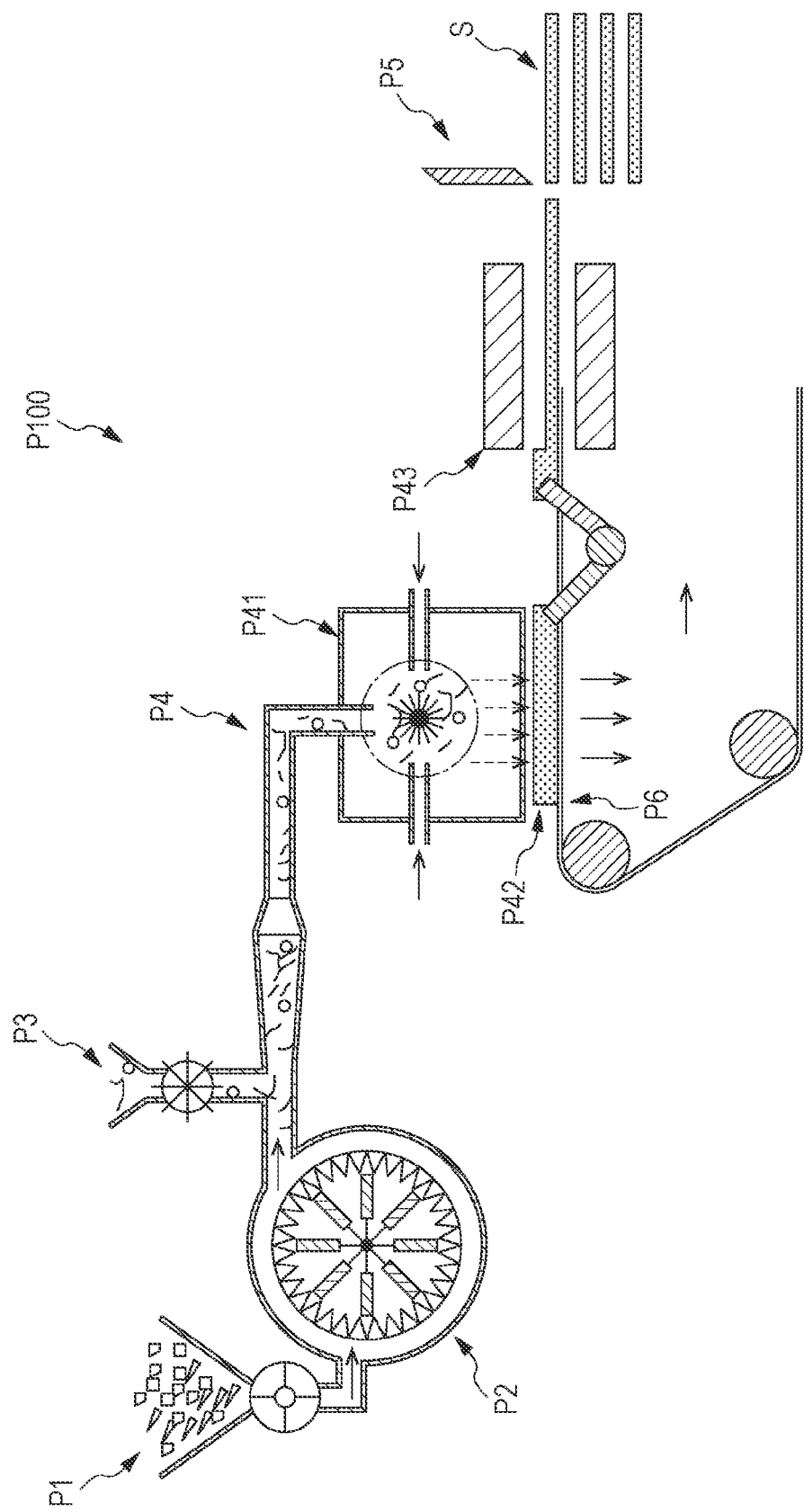
FIG. 2 is a configuration diagram schematically illustrating a preferred embodiment of an apparatus used for manufacturing the liquid absorber in the present disclosure.

FIG. 2 is a configuration diagram schematically illustrating a preferred embodiment of an apparatus used for manufacturing the liquid absorber of the present disclosure.

In the following description, as the apparatus, a sheet manufacturing apparatus that manufactures a sheet corresponding to the absorption layer of the liquid absorber will be described by way of example.

A sheet manufacturing apparatus P100 manufactures a sheet corresponding to a portion to be the absorption layer A3.

As illustrated in FIG. 2, the sheet manufacturing apparatus P100 includes a fiber supply unit P1 supplying a fiber source, a defibration unit P2 defibrating the supplied fiber source, a heat-fusible resin supply unit P3 supplying a heat-fusible resin, a molding unit P4 molding a mixture containing the fiber and the heat-fusible resin into a predetermined shape, and a cutting unit P5 cutting a molded body manufactured by the molding unit P4.

The fiber supply unit P1 includes a quantitative feeder that quantifies the fiber source and supplies the fiber source to the defibration unit P2. As the fiber source, for example, used paper containing a cellulose fiber can be suitably used.

The defibration unit P2 has a function of defibrating the fiber source to a predetermined size.

The heat-fusible resin supply unit P3 includes a quantitative feeder that quantitatively supplies the heat-fusible resin. Thus, a mixing ratio of the heat-fusible resin to the fiber can be suitably adjusted.

The molding unit P4 includes a mixing portion P41 that uniformly mixes the fiber and the heat-fusible resin by stirring, a molding portion P42 that molds the mixture into a sheet shape, and a fixing portion P43 that fixes each component by melting or softening at least a part of the heat-fusible resin by pressurizing and heating.

The mixing portion P41 introduces gas for stirring and mixes each component. As a result, more uniform mixing can be efficiently performed.

The molding portion P42 sucks the mixture applied onto a transport unit P6 with air permeability through the transport unit P6, to bring the mixture into close contact with the transport unit P6 and mold the mixture into a sheet shape.

The fixing portion P43 fixes each component by melting or softening at least a part of the heat-fusible resin by pressurizing and heating in a predetermined condition. As a result, a molded body having an excellent shape stability can be obtained.

A pressurizing treatment of the fixing portion P43 is preferably performed under conditions of a temperature of 100° C. or higher and 250° C. or lower, a pressure of 1,000 Pa or higher and 8,000 Pa or lower, and a time of 30 seconds or longer and 120 seconds or shorter.

Accordingly, a liquid absorption performance and flame retardancy of the liquid absorber A100 can be further improved.

As described above, a treatment temperature during the pressurizing treatment of the fixing portion P43 is preferably 100° C. or higher and 250° C. or lower, more preferably 190° C. or higher and 240° C. or lower, and still more preferably 200° C. or higher and 230° C. or lower.

As a result, the effect described above can be remarkably exhibited.

As described above, the pressurizing pressure of the fixing portion P43 is preferably 1,000 Pa or higher and 8,000 Pa or lower, more preferably 3,000 Pa or higher and 6,000 Pa or lower, and still more preferably 4,000 Pa or higher and 5,000 Pa or lower.

As a result, the effect described above can be remarkably exhibited.

As described above, the treatment time in the pressurizing treatment of the fixing portion P43 is preferably 30 seconds or longer and 120 seconds or shorter, more preferably 40 seconds or longer and 110 seconds or shorter, and still more preferably 50 seconds or longer and 100 seconds or shorter.

As a result, the effect described above can be remarkably exhibited.

The cutting unit P5 cutting a sheet S as a molded body manufactured by the molding unit P4 is arranged on a downstream of the molding unit P4.

By cutting with the cutting unit P5, the sheet S having a desired size can be obtained.

Thereafter, the obtained sheet S is sandwiched between the first base material A1 and the second base material A2 that are prepared separately, and the first base material A1, the sheet S, and the second base material A2 are joined to each other, thereby obtaining a liquid absorber A100.

As the first base material A1 and the second base material A2, for example, a commercially available flame-retardant filament nonwoven fabric may be used, or a material obtained by adhering the flame retardant on a surface of the filament nonwoven fabric as a parent material by a coating method, and a material obtained by molding a kneaded product containing a resin material and the flame retardant by a method such as a spunbonding method or a spunlacing method may be used.

The first base material A1 is placed on the transport unit P6, the mixture is accumulated on the first base material A1, the second base material A2 is further accumulated on the mixture, and then heating and pressurizing may be performed by the fixing portion P43.

3. Printing Apparatus

Next, a printing apparatus of the present disclosure will be described.

The printing apparatus of the present disclosure includes the liquid absorber of the present disclosure as described above.

Accordingly, it is possible to provide a printing apparatus including the liquid absorber that can have excellent flame retardancy and a stable and excellent liquid absorption performance for a long period of time.

Hereinafter, preferred embodiments of the printing apparatus of the present disclosure will be described in detail with reference to the accompanying drawings.

Figure 3:
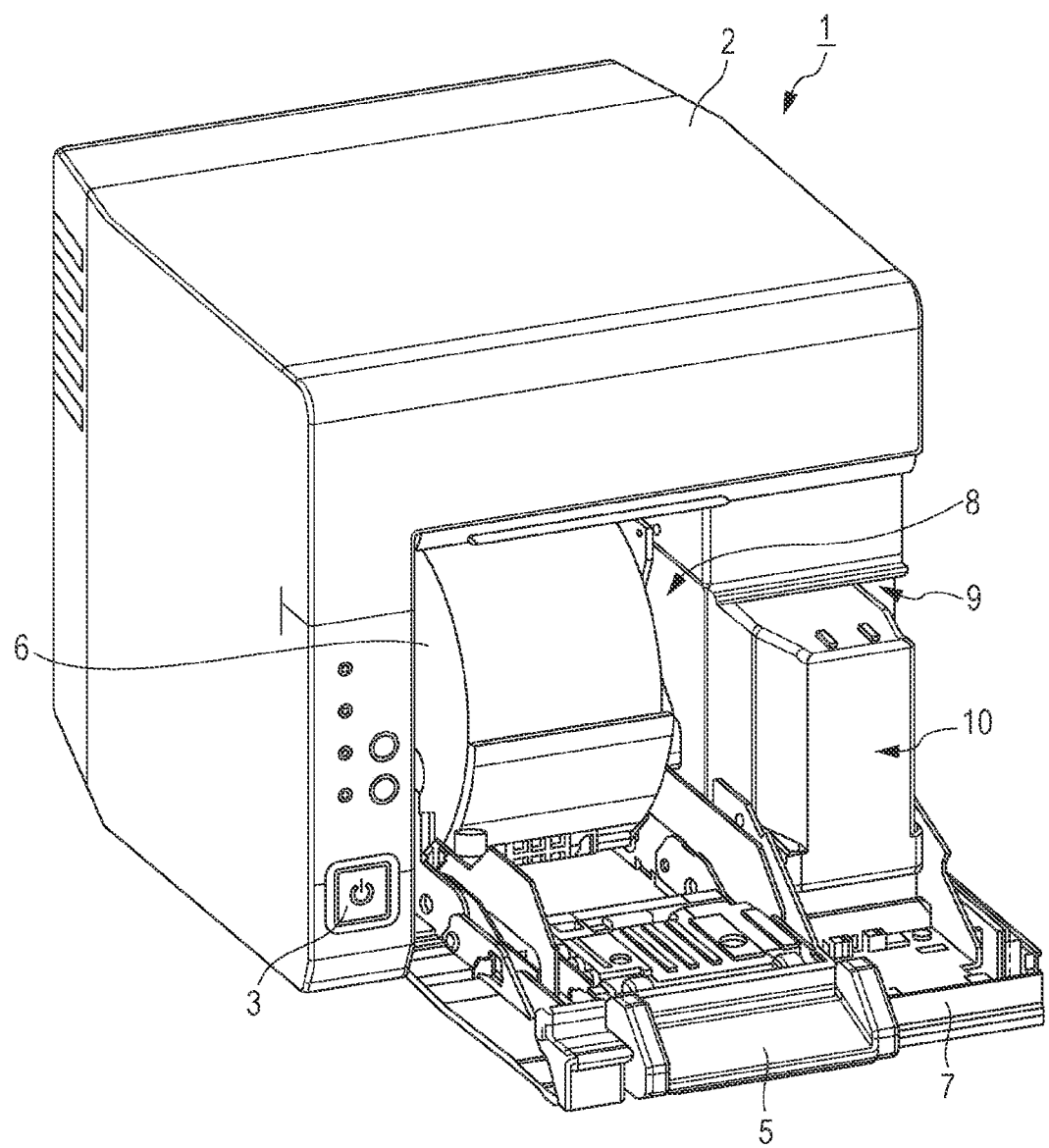
FIG. 3 is an external perspective view illustrating an overall configuration of an example of an ink jet printer, which is a printing apparatus.
Figure 4:
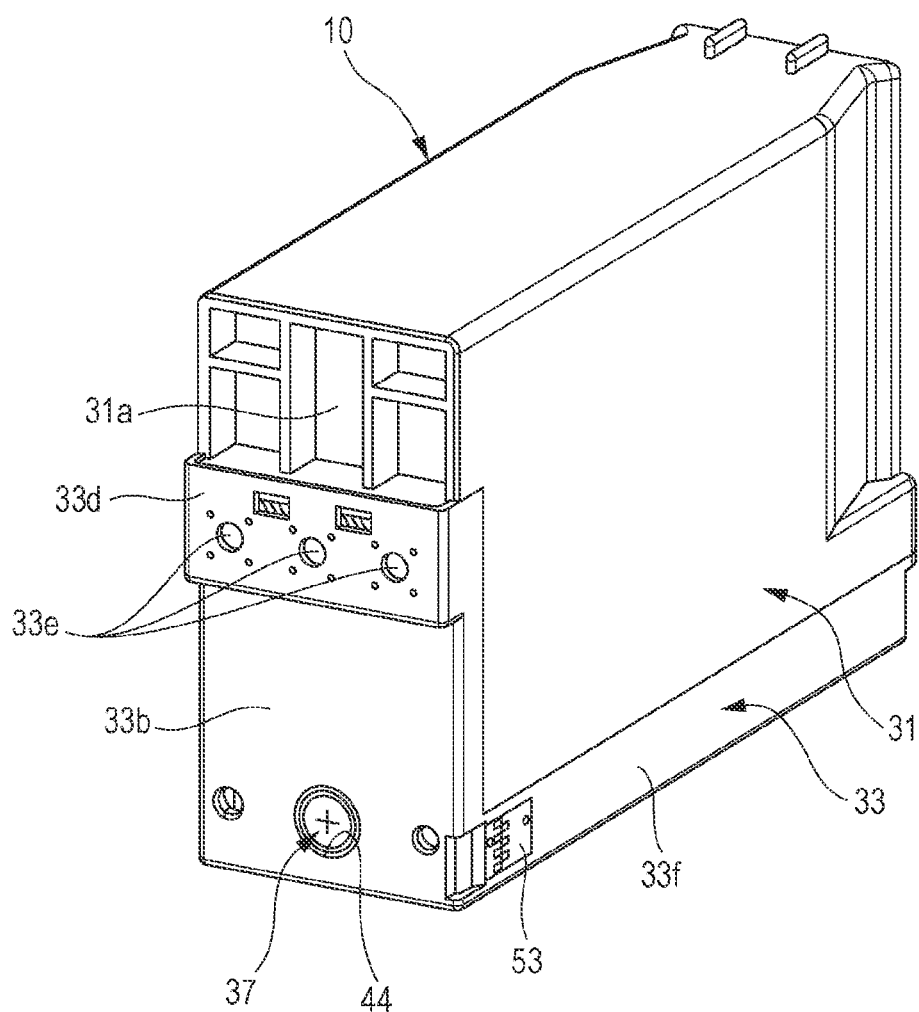
FIG. 4 is an overall perspective view illustrating an ink cartridge of the ink jet printer illustrated in FIG. 3.
Figure 5:
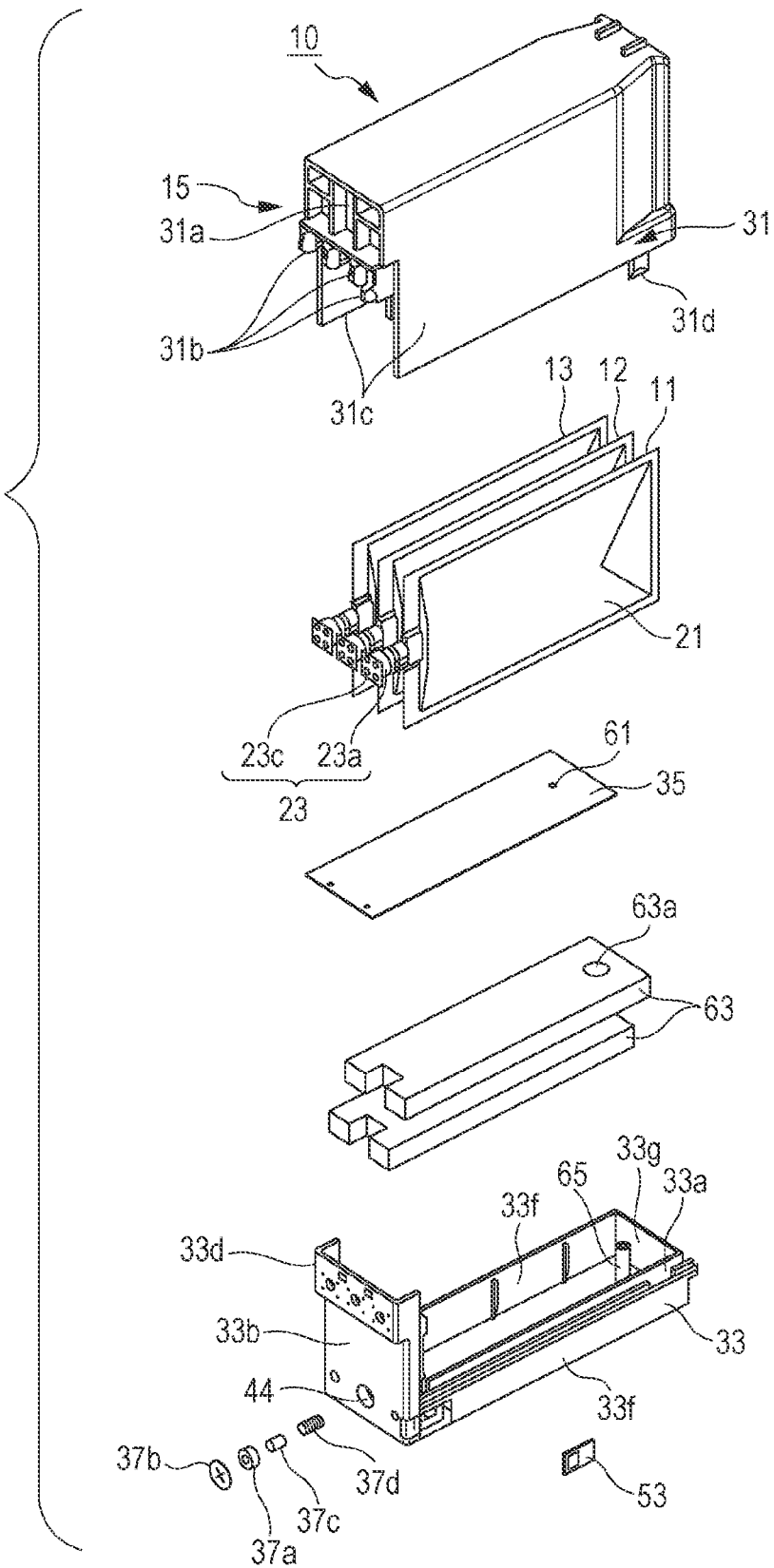
FIG. 5 is an exploded perspective view of the ink cartridge illustrated in FIG. 4.
Figure 6:
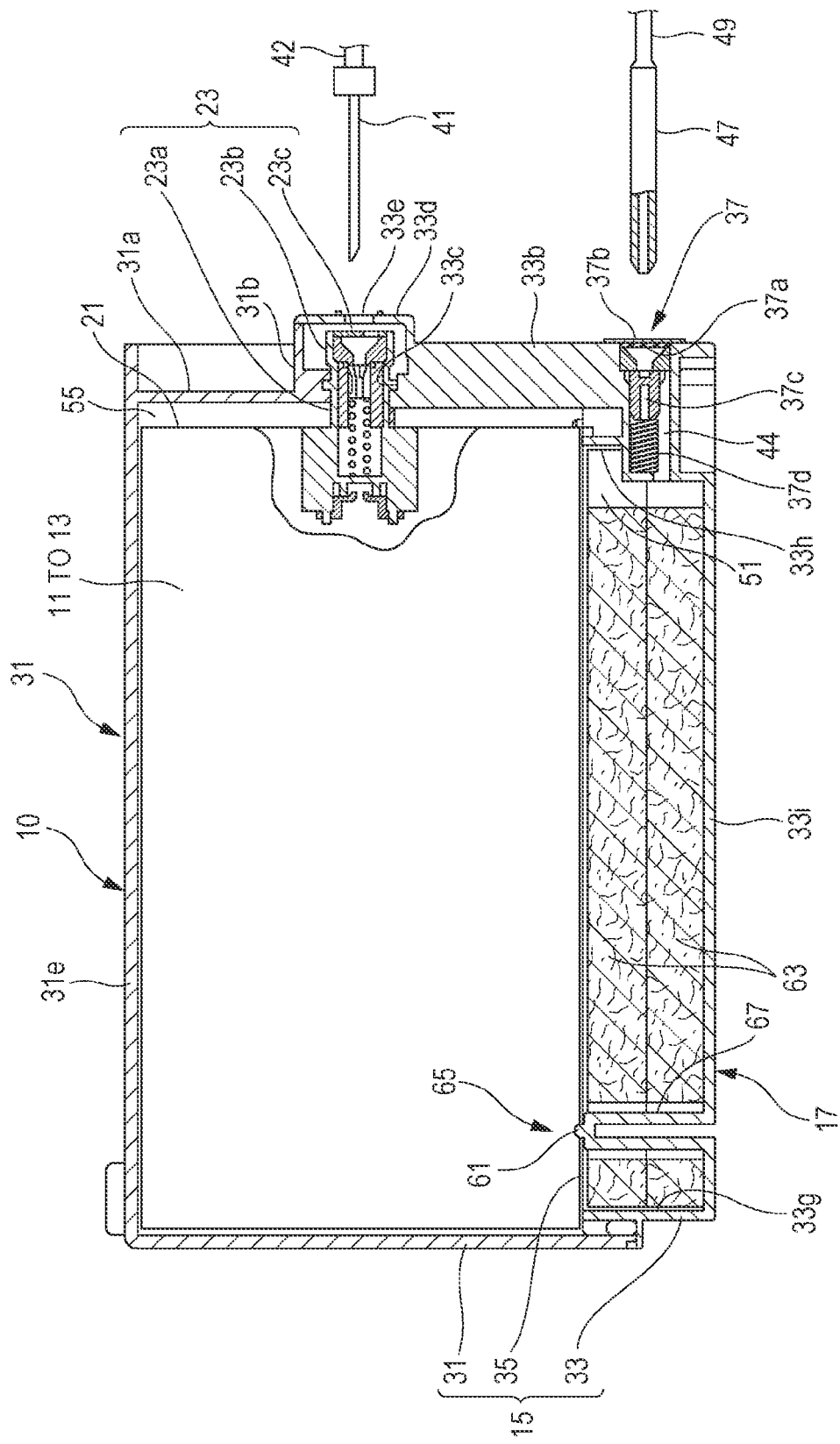
FIG. 6 is a vertical sectional view of the ink cartridge illustrated in FIG. 4.
Figure 7:
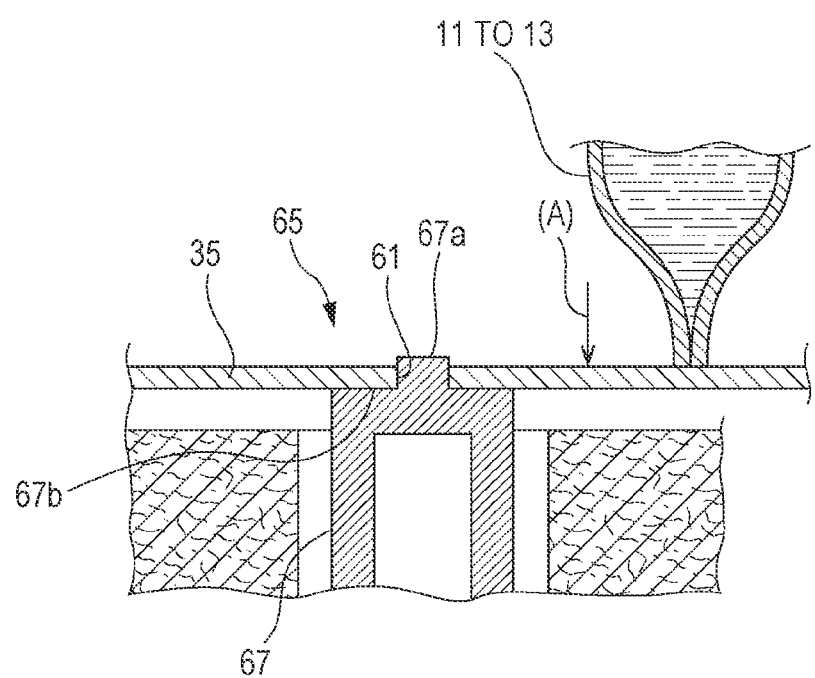
FIG. 7 is an enlarged cross-sectional view illustrating a main part of the ink cartridge illustrated in FIG. 4.
Figure 8A:
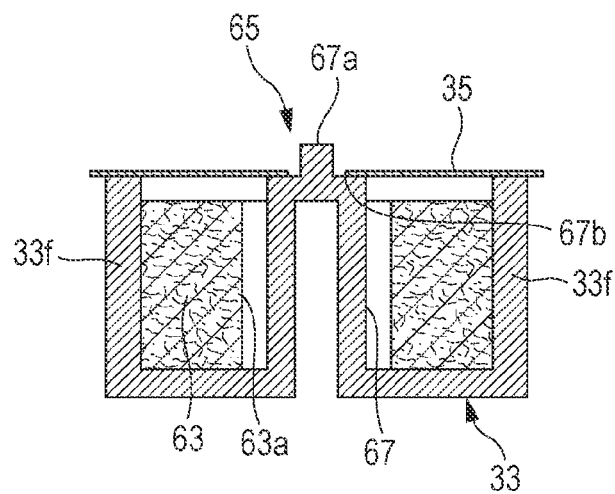
Figure 8B:
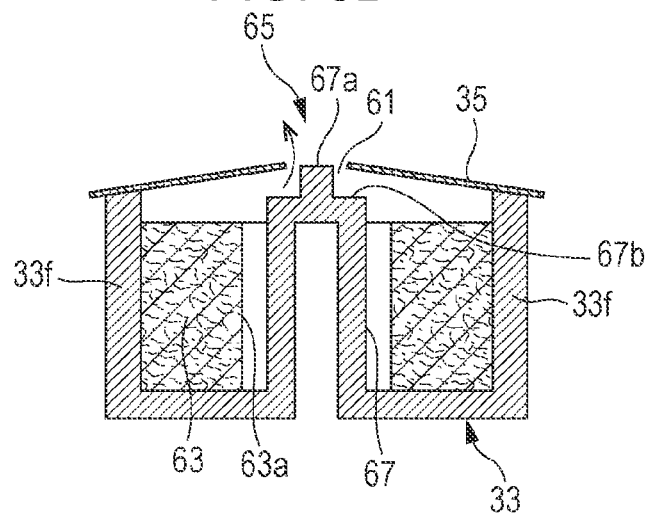
Figure 8C:
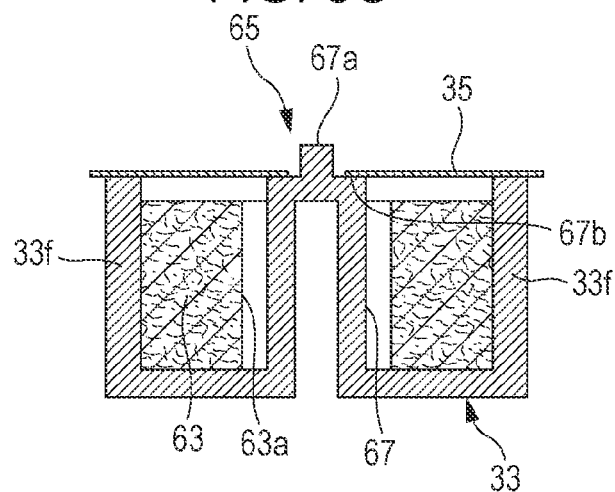

FIG. 3 is an external perspective view illustrating an overall configuration of an example of an ink jet printer, which is a printing apparatus. FIG. 4 is an overall perspective view illustrating an ink cartridge of the ink jet printer illustrated in FIG. 3. FIG. 5 is an exploded perspective view of the ink cartridge illustrated in FIG. 4. FIG. 6 is a vertical sectional view of the ink cartridge illustrated in FIG. 4. FIG. 7 is an enlarged cross-sectional view illustrating a main part of the ink cartridge illustrated in FIG. 4. FIGS. 8A to 8C are cross-sectional views illustrating an opening/closing operation of an opening/closing valve illustrated in FIG. 6, in which FIG. 8A is a cross-sectional view illustrating the opening/closing valve being closed, FIG. 8B is a cross-sectional view illustrating the opening/closing valve being opened due to an increase in pressure in a storage space of waste ink by introduction of the waste ink, and FIG. 8C is a cross-sectional view illustrating the opening/closing valve being closed again after the introduction of the waste ink is completed.

An ink jet printer 1 performs color printing on roll paper using a plurality of types of ink. As illustrated in FIG. 3, a roll paper cover 5 and an ink cartridge cover 7 are mounted openably and closably on a front surface of a printer case 2 to cover a printer main body. Further, a feed switch or an indicator is arranged on the front surface of the printer case 2 together with a power switch 3.

As illustrated in FIG. 3, when the roll paper cover 5 is opened, a paper accommodating portion 8 for accommodating the roll paper 6, which is a printing paper, is opened, and the paper can thus be replaced. Further, when the ink cartridge cover 7 is opened, a cartridge mounting portion 9 is opened, and an ink cartridge 10 can be attached to/detached from the cartridge mounting portion 9.

The ink jet printer 1 is configured such that the ink cartridge 10 is pulled out by a predetermined distance in front of the cartridge mounting portion 9 in conjunction with an operation of opening the ink cartridge cover 7.

As illustrated in FIGS. 4 to 6, the ink cartridge 10 is mounted on the cartridge mounting portion 9 of the ink jet printer 1, and a cartridge case 15 accommodating three ink packs 11, 12, and 13 is mounted with a waste ink storage structure 17 that stores waste ink generated during an ink filling operation or a head cleaning operation of the printer.

The three ink packs 11, 12, and 13 are filled with different color inks for color printing, respectively. Each of the ink packs 11, 12, and 13 has a similar structure and includes a flexible bag 21 for accommodating ink and an ink outlet 23 joined to a front end portion of the bag 21.

The bag 21 is formed by stacking two aluminum laminated films and joining them therearound by a method such as heat fusion. The reason for adopting the aluminum laminated film is to improve a gas barrier property. For example, the aluminum laminated film is adopted to have a structure in which the outside of the aluminum foil is sandwiched with nylon films and the inside of the aluminum foil is sandwiched with polyethylene films.

As illustrated in FIG. 6, the ink outlet 23 includes a tubular body 23a, a valve 23b, and a seal film 23c. The tubular body 23a has a base end side having an outer diameter set to be larger than that of a tip end side, and the base end side is fixed into the bag 21, the valve 23b is mounted in the tubular body 23a and opens/closes a flow path of the tubular body 23a, and the seal film 23c is attached to a tip end of the tubular body 23a and seals an opening of the tubular body 23a. The tubular body 23a of the ink outlet 23 is formed of, for example, hard plastic or the like. The seal film 23c is formed of a polyethylene film.

The ink outlet 23 is integrated with the tubular body 23a by fixing a base end portion of the tubular body 23a to the aluminum laminated film of the bag 21 by heat fusion or the like.

As illustrated in FIGS. 5 and 6, the cartridge case 15 includes an upper case 31, a lower case 33 connected to a lower portion of the upper case 31, and an intermediate container wall 35 that partitions a space divided into the upper case 31 and the lower case 33 into upper and lower portions.

The upper case 31 and the lower case 33 are molded products made of a plastic material, and the intermediate container wall 35 is formed of a plastic film which is a flexible sheet member.

The upper case 31 has a box shape with a lower side open, and a front container wall 31a is set to be shorter than both side and rear container walls. Semi-cylindrical ink pack positioning portions 31b are formed at a lower end of the front container wall 31a to position the upper half of the ink outlets 23 of the ink packs 11, 12, and 13. The semi-cylindrical ink pack positioning portions 31b are formed at a total of three locations according to the three ink packs 11, 12, and 13 to be accommodated.

A locking protrusion 31d that connects the upper and lower cases to each other by engaging with an engagement portion 33a on the lower case 33 side is provided at a lower end of a side wall 31c, which is a container wall on both side surfaces of the upper case 31, and at a position close to a rear end of the side wall 31c.

The lower case 33 is a thin dish-shaped box with an upper portion open. The front container wall 33b is set to be higher than the both side and rear container walls, and semi-cylindrical ink pack positioning portions 33c are formed at an upper end of the front container wall 33b to position the lower half of the ink outlets 23 of the ink packs 11, 12, and 13.

As illustrated in FIG. 6, the semi-cylindrical ink pack positioning portion 33c positions and fixes the ink outlets 23 of the ink packs 11, 12, and 13 by sandwiching the ink outlet 23 from upper and lower portions with the ink pack positioning portion 31b of the upper case 31. The semi-cylindrical ink pack positioning portions 33c are also formed at a total of three locations according to the three ink packs 11, 12, and 13 to be accommodated, like the ink pack positioning portions 31b described above.

A cover portion 33d that extends from the front end of the ink pack positioning portion 33c and covers the front of the ink outlet 23 is formed at the upper end of the front container wall 33b. As illustrated in FIG. 6, the cover portion 33d is formed with an opening 33e penetrating therethrough, through which an ink supply needle 41 mounted on the cartridge mounting portion 9 of the ink jet printer 1 is inserted.

Three openings 33e are formed by centering each of the three semi-cylindrical ink pack positioning portions 33c.

Therefore, when the ink cartridge 10 is mounted on the cartridge mounting portion 9 of the ink jet printer 1, the ink supply needle 41 mounted on the cartridge mounting portion 9 airtightly penetrates the ink outlet 23, and the ink in the bag 21 can be supplied to a printer side through the ink supply needle 41. A supply tube 42 for supplying the ink to a print head of the printer is coupled to the ink supply needle 41.

An introduction inlet 44 constituting a waste ink introduction portion 37 in the waste ink storage structure 17 is formed at a position close to the lower portion of the front container wall 33b.

As illustrated in FIGS. 5 and 6, the waste ink introduction portion 37 includes a rubber spout member 37a having a tapered shape in which an inner diameter expands toward the tip end, a seal film 37b attached to a tip end of the rubber spout member 37a, a valve 37c abutted against a rear end of the rubber spout member 37a to close an opening of the rubber spout member 37a, and a compression coil spring 37d urged in a direction in which the valve 37c abuts against the rubber spout member 37a.

The introduction inlet 44 is mounted with a protrusion that is prevented from pulling off by locking a front end of the rubber spout member 37a to an opening edge of the foremost end. In the compression coil spring 37d, the valve 37c abuts against the rear end of the rubber spout member 37a, and at the same time, the rubber spout member 37a is pressed and urged forward, and the front end of the rubber spout member 37a is maintained to be brought into close contact with the protrusion at the foremost end of the introduction inlet 44.

When the ink cartridge 10 is mounted on the cartridge mounting portion 9 of the ink jet printer 1, a waste ink introduction needle 47 mounted on the cartridge mounting portion 9 is airtightly fitted to the rubber spout member 37a, and at the same time, pushes the valve 37c, and waste ink can thus be introduced into the storage space 51 through the waste ink introduction needle 47.

The waste ink introduction needle 47 is coupled to a waste ink guiding tube 49 that guides the waste ink generated during the ink filling operation or the head cleaning operation of the ink jet printer 1 to the waste ink introduction needle 47.

As illustrated in FIGS. 4 and 5, a side container wall 33f of the lower case 33 is mounted with an IC module 53 capable of recording types of respective accommodated ink packs 11, 12, and 13, a residual amount of ink, and other data.

When the ink cartridge 10 is mounted on the cartridge mounting portion 9 of the ink jet printer 1, the IC module 53 is electrically coupled to a coupling terminal mounted on the cartridge mounting portion 9. Various information can be read from a printer-side control circuit or a computer coupled to the printer.

The intermediate container wall 35, which is a container wall formed of a plastic film such as a polyethylene film as a flexible sheet member, is fixed to the lower case 33 in a slightly tensed state by stacking a peripheral edge portion of the intermediate container wall 35 on upper end surfaces of the side container wall 33f and front/rear container walls 33g and 33h of the lower case 33 and joining the stacked portions by a method such as heat fusion.

By fixing the intermediate container wall 35 to the lower case 33 so as to cover an upper end opening of the lower case 33, the storage space 51 constituting the waste ink storage structure 17 is divided between a bottom wall 33i of the lower case 33 and the intermediate container wall 35 as illustrated in FIG. 6. In addition, an ink pack accommodating space 55 accommodating three ink packs 11, 12, and 13 in an upright state as illustrated in FIG. 5 is divided between a ceiling wall 31e of the upper case 31 and the intermediate container wall 35.

As illustrated in FIG. 7, the ink packs 11, 12, and 13 are accommodated so that the lower end thereof abuts against the intermediate container wall 35, and the intermediate container wall 35 is pressed and urged downward due to the weight of the ink packs 11, 12, and 13, as indicated by arrow (A).

Therefore, a force for pressing and urging the intermediate container wall 35 downward by the ink packs 11, 12, and 13 can function as an urging force that keeps the opening/closing valve 65 of the waste ink storage structure 17 to be described later closed. In this case, the intermediate container wall 35 can be fixed to the lower case 33 without applying tension.

As illustrated in FIG. 6, the waste ink storage structure 17 in the present embodiment includes the storage space 51 which is divided by the lower case 33 and the intermediate container wall 35 and stores the waste ink, the waste ink introduction portion 37 for introducing the waste ink in the storage space 51, a ventilation hole 61 for communicating the storage space 51 to the outside, ink absorbing materials 63 which permeate and absorb the waste ink filled in the storage space 51 and introduced from the waste ink introduction portion 37 to the storage space 51 as two liquid absorbers, and the opening/closing valve 65 which opens/closes the ventilation hole 61.

As illustrated in FIGS. 5 and 6, the waste ink introduction portion 37 introducing the waste ink into the storage space 51 is provided at the introduction inlet 44 formed on the front container wall 33b as a part of the container wall dividing the storage space 51.

As illustrated in FIG. 6, a rear end of the introduction inlet 44, that is, a left end of the introduction inlet 44 in FIG. 6 communicates with the storage space 51, and the waste ink introduced from the waste ink introduction needle 47 that is inserted into the waste ink introduction portion 37 flows from the rear end of the introduction inlet 44 to the storage space 51.

The ventilation hole 61 formed in the intermediate container wall 35 is a circular opening that opens the storage space 51 to the atmosphere, it is desirable that a position where the ventilation hole 61 is formed is a position in the storage space 51 where the waste ink finally reaches. In the present embodiment, as illustrated in FIG. 5, the ventilation hole 61 is provided at a position near the rear end away from the waste ink introduction portion 37 while not interfering with the lower ends of the ink packs 11, 12, and 13.

The ink absorbing material 63, which is applied to the above-mentioned liquid absorber of the present disclosure, permeates and absorbs the introduced waste ink so that the waste ink introduced into the storage space 51 through the waste ink introduction portion 37 and the introduction inlet 44 is prevented from flowing backward in a side of the waste ink introduction portion 37 and leaking to the outside.

The opening/closing valve 65 provided in the ventilation hole 61 opens only the ventilation hole 61 when the waste ink is introduced to allow air in the storage space 51 to be released to the outside so as not to interfere with the introduction of the waste ink from the waste ink introduction portion 37.

In a case of the present embodiment, as a plastic film used for the intermediate container wall 35 provided with the ventilation holes 61, a plastic film that is flexible enough to expand upward due to a pressure of introducing the waste ink from the waste ink introduction portion 37 is selected.

In a case of the present embodiment, as illustrated in FIGS. 8A to 8C, the opening/closing valve 65 has the intermediate container wall 35 including the ventilation hole 61, and a valve structural member 67 provided in the storage space 51 so that a tip end portion thereof abuts against a peripheral edge of the ventilation hole 61 and closes the ventilation hole 61.

The valve structural member 67, which is a substantially columnar column, has a positioning protrusion 67a protruding from the tip end portion and penetrating the ventilation hole 61, and a stepped surface 67b expanded from a hem portion of the positioning protrusion 67a and abutting against the peripheral edge of the opening of the ventilation hole 61. The valve structural member 67 is integrally formed with the bottom wall 33i of the lower case 33 facing the ventilation hole 61. The two ink absorbing materials 63 filled in the storage space 51 penetrate a hole 63a through which the valve structural member 67 is inserted.

As illustrated in FIG. 8A, the opening/closing valve 65 is kept in a state in which the stepped surface 67b of the valve structural member 67 abuts against the peripheral edge of the ventilation hole 61 to close the ventilation hole 61, and the ventilation hole 61 is closed except when the waste ink is introduced from the waste ink introduction portion 37.

As illustrated in FIG. 8B, in the opening/closing valve 65, the intermediate container wall 35 is deformed and expands upward when the pressure in the storage space 51 increases with the introduction of waste ink. Then, the peripheral edge of the ventilation hole 61 is separated from the stepped surface 67b of the valve structural member 67, and thus the opening/closing valve 65 opens the storage space 51 to the atmosphere through the ventilation hole 61.

As illustrated in FIG. 8C, when the pressure in the storage space 51 decreases after the introduction of the waste ink is completed, the ventilation hole 61 is closed because the opening/closing valve 65 is urged in a direction in which the peripheral edge of the ventilation hole 61 abuts against the stepped surface 67b of the valve structural member 67, by a tension of the intermediate container wall 35 and the ink packs 11, 12, and 13 that press and urge the intermediate container wall 35 downward.

According to the waste ink storage structure 17 of the present embodiment described above, the ventilation hole 61 that opens the storage space 51 to the atmosphere is kept to be closed by the opening/closing valve 65 except when the waste ink is introduced from the waste ink introduction portion 37.

Therefore, moisture in the waste ink introduced into the storage space 51 can be suppressed from evaporating from the ventilation holes 61 to the outside, to prevent the waste ink from solidifying in the storage space 51 and prevent deterioration of a permeation absorption performance due to solidification of waste ink in the ink absorbing material 63. Further, as described above, the liquid absorber of the present disclosure itself has an excellent liquid absorption performance, and this absorption performance can be stably maintained for a long period of time. Therefore, the above effects act synergistically, and the ink jet printer 1 provided with the waste ink storage structure 17 including the ink absorbing material 63 to which the liquid absorber of the present disclosure is applied can maintain the stable permeation absorption performance especially for a long period of time. Further, clogging due to the solidified waste ink is effectively prevented. Therefore, an increase in abnormal pressure is reliably prevented by the waste ink guiding tube 49 on a waste ink supply side that is coupled to the waste ink introduction portion 37, and inconveniences such as leakage of ink due to disconnection of the waste ink guiding tube 49 can be reliably prevented.

In the waste ink storage structure 17 of the present embodiment, when the used ink cartridge 10 is disposed for example, the upper case 31 and the lower case 33 are separated from each other, and the intermediate container wall 35 made of plastic film is then peeled off from the lower case 33. Therefore, one surface of the storage space 51 can be opened, thereby easily taking out the ink absorbing material 63 in which the waste ink has permeated from the inside of the storage space 51. Therefore, it becomes easy to disassemble the used ink cartridge 10 for recycling or reuse of components and materials and classify them by material. Further, as described above, the liquid absorber of the present disclosure itself has an excellent liquid absorption performance, and this absorption performance can be stably maintained for a long period of time. Therefore, in the ink jet printer 1 provided with the ink absorbing material 63 to which the liquid absorber of the present disclosure is applied, falling-off of the ink components from the ink absorbing material 63 is reliably prevented when the ink absorbing material 63 in which the waste ink has permeated is taken out from the storage space 51.

The opening/closing valve 65 that opens/closes the ventilation hole 61 can be obtained only by integrally forming the valve structural member 67 on the bottom wall 33i at a position facing the ventilation hole 61 that penetrates the intermediate container wall 35 made of plastic film, the valve structural member 67 having the tip end portion abutting against the peripheral edge of the ventilation hole 61 and closes the ventilation hole 61. Therefore, it is not necessary to add components for mounting the opening/closing valve, and there is no cost increase due to an increase in the number of components and an increase in the component assembly process.

In the ink cartridge 10 of the above embodiment, the intermediate container wall 35 provided with the ventilation holes 61 divides the ink pack accommodating space 55 accommodating the ink packs 11, 12, and 13 and the storage space 51.

Since the ventilation hole 61 is not directly exposed to the outside of the ink cartridge 10, but is opened to the atmosphere through the ink pack accommodating space 55 accommodating the ink packs 11, 12, and 13, there is no risk that a user will inadvertently touch the opening/closing valve 65 provided with the ventilation hole 61 and interfere with the valve function.

Further, the positioning protrusion 67a penetrating the ventilation hole 61 protrudes from the tip end portion of the valve structural member 67 in the present embodiment.

The tip end portion of the valve structural member 67 and the ventilation hole 61 of the intermediate container wall 35 during assembly are easily aligned, thus improving an assembling property.

A specific structure of the ink cartridge provided with the waste ink storage structure is not limited to the ink cartridge 10 of the above embodiment. The above-mentioned waste ink storage structure can be applied to various ink cartridges with the support structures of the ink pack, the different number of ink packs to be accommodated, and the like.

The specific structure of the valve structural member is not limited to a configuration of the valve structural member 67 of the above embodiment. For example, the specific structure of the valve structural member may be a plate-shaped rib structure in which an upper end surface of the valve structural member closes the ventilation hole 61.

Figure 10:
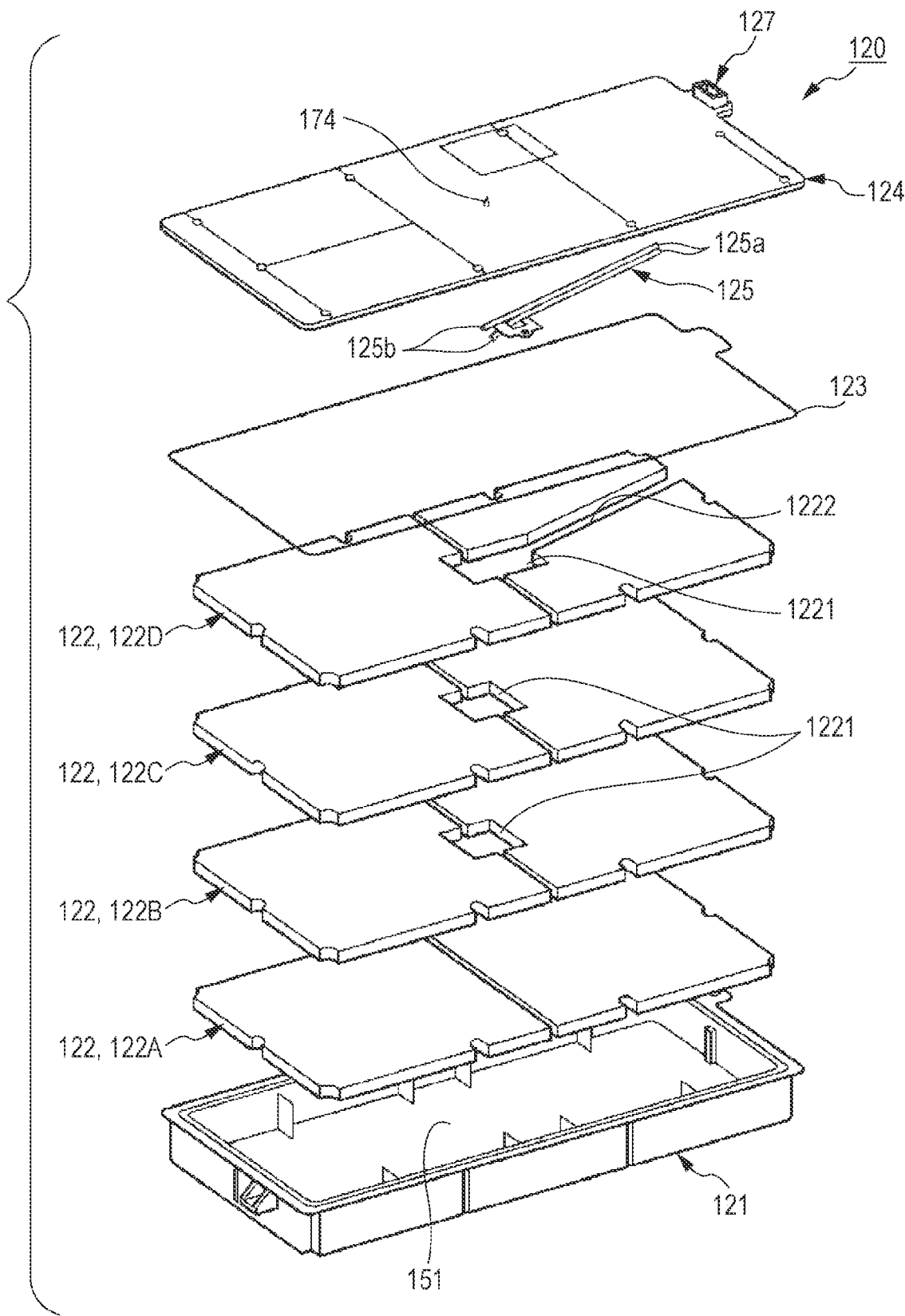
FIG. 10 is an exploded perspective view illustrating a waste ink tank of the ink jet printer illustrated in FIG. 9.
Figure 11A:
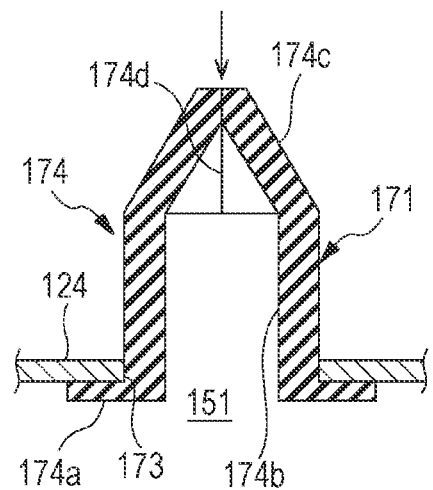
FIGS. 11A and 11B are enlarged cross-sectional views illustrating the opening/closing valve provided on the waste ink tank illustrated in FIG. 10.
Figure 11B:
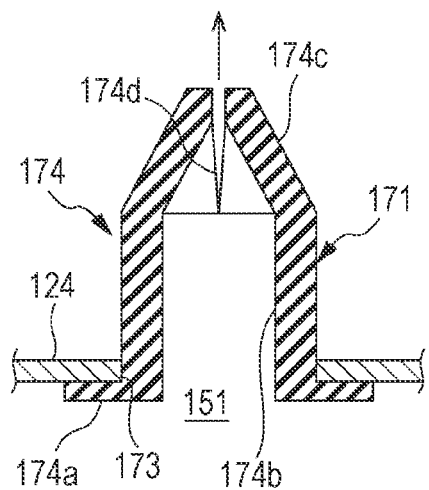
Figure 12:
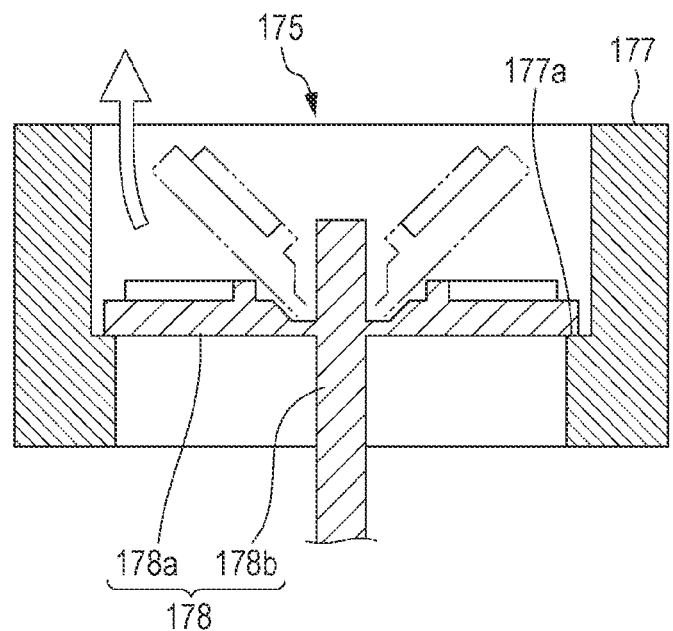
FIG. 12 is a vertical sectional view illustrating another configuration example of the opening/closing valve.

FIG. 9 is an exploded perspective view schematically illustrating an overall configuration of the ink jet printer which is a printing apparatus, FIG. 10 is an exploded perspective view illustrating a waste ink tank of the ink jet printer illustrated in FIG. 9, FIGS. 11A and 11B are enlarged cross-sectional views illustrating the opening/closing valve provided on the waste ink tank illustrated in FIG. 10, and FIG. 12 is a vertical sectional view illustrating another configuration example of the opening/closing valve.

As illustrated in FIG. 9, an ink jet printer 101 of the present embodiment includes a printer housing 111 which is a bottom housing, a waste ink tank 120 having a rectangular shape in a plan view and detachably mounted on a tank accommodating portion 111s defined on an inner bottom portion thereof, a printer mechanism 115 installed on above the printer housing 111 and the waste ink tank 120, and an exterior cover 112 which is an upper housing. In addition, a power unit 116 is mounted on a rear side of the tank accommodating portion 111s accommodating the waste ink tank 120.

The waste ink tank 120 includes a flat box-shaped tank body 121 accommodating a plurality of ink absorbing materials 122 that permeate and absorb the waste ink introduced into a storage space 151 to be replaceable, and a lid 124 sealing an opening on an upper surface of the tank body 121 through a sealing material 123 such as rubber packing. In particular, in the configuration illustrated in FIG. 10, the waste ink tank 120 includes four ink absorbing materials 122A, 122B, 122C, and 122D. Further, a rear surface of the lid 124 is mounted with a tube 125 that guides the waste ink from an ink receiving portion 127 at a peripheral edge portion of the waste ink tank to a central portion of the waste ink tank and allows the waste ink to add dropwise at an upper center portion of the ink absorbing material 122. A color of plastic components constituting the waste ink tank 120 is preferably dark color, for example, black.

The waste ink tank 120 can be set to the printer housing 111 by being fitted into the tank accommodating portion 111s on the printer housing 111 and fixed with screws, and coupling an outlet of a suction pump and a base end inlet 125a of the tube 125 to each other on the waste ink tank 120. In addition, when removing the waste ink tank 120, a reverse operation is performed, thereby separately removing the waste ink tank 120 from the printer housing 111.

The ink absorbing material 122 is configured as a laminate in which a thin plate-shaped molded bodies to which the liquid absorber of the present disclosure is applied are laminated in multiple stages from a bottom layer to a top layer. In particular, in the illustrated configuration, the ink absorbing material 122 is configured as a laminate in which the ink absorbing materials 122A, 122B, 122C, and 122d are laminated in four stages. In addition, on a center of the flat surface of the three stages of the ink absorbing materials 122B, 122C, and 122D except for the ink absorbing material 122A, which is a bottom layer, a center hole 1221 is provided to vertically penetrate the ink absorbing materials 122B, 122C, and 122D. A tube accommodating groove 1222 is formed from a peripheral edge portion to the center hole 1221, in the ink absorbing material 122D, which is a top layer.

The tube 125 is accommodated in the tube accommodating groove 1222 formed in the ink absorbing material 122D of the top layer, the base end inlet 125a of the tube 125 is positioned at the ink receiving portion 127 provided in the peripheral edge portion of the lid 124, and a tip end outlet 125b of the tube 125 is positioned in the center hole 1221 of the ink absorbing material 122D of the top layer.

That is, the waste ink tank 120 of the present embodiment includes a waste ink storage structure in which the ink receiving portion 127, which is a waste ink introduction portion for introducing the waste ink into the storage space 151, and the ventilation hole 173 opening the storage space 151 to the atmosphere are provided on the lid 124 which is a container wall dividing the storage space 151 that stores the waste ink generated during the ink filling operation or the head cleaning operation of the printer.

Moreover, as illustrated in FIGS. 11A and 11B, the ventilation hole 173 formed on the lid 124 is provided with an opening/closing valve 171 that is opened only when the waste ink is introduced. In the opening/closing valve 171, a valve 174 that closes the ventilation hole 173 formed on the lid 124 is integrally molded with an elastic member having an opening/closing portion 174c that is elastically deformed in a direction in which the opening/closing valve 171 is opened by a pressure of introducing the waste ink from the ink receiving portion 127.

In the valve 174, a flange portion 174a closely joined to the peripheral edge portion of the ventilation hole 173, a cylindrical portion 174b penetrating the ventilation hole 173 from an inner peripheral portion of the flange portion 174a, and a plurality of opening/closing portions 174c formed by putting an axial notch 174d into a conical portion coupled to a tip end of the cylindrical portion 174b so as to close the tip end of the cylindrical portion 174b are integrally formed of a rubber material.

The opening/closing portion 174c of the opening/closing valve 171 is closed as illustrated in FIG. 11A before the waste ink is introduced. However, when the waste ink is introduced, the opening/closing portion 174c is elastically deformed in a direction in which the opening/closing valve 171 is opened by the pressure of introducing the waste ink from the ink receiving portion 127 as illustrated in FIG. 11B, the notch 174d is opened, and the air in the storage space 151 is released to the outside.

Therefore, a dedicated valve 174 constituting the opening/closing valve 171 is required. However, instead of the dedicated valve body, by appropriately setting elastic characteristics of the opening/closing portion 174c of the valve 174, it is possible to improve a sealing performance of the ventilation hole 173 of the opening/closing valve 171, and to improve a performance that prevents evaporation of moisture from the ventilation hole 173.

Further, a degree of freedom in designing the waste ink tank 120 including the waste ink storage structure is improved because there is no limitation in the material of the lid 124 for forming the ventilation hole 173.

The above-described waste ink tank 120 of the present embodiment can suppress evaporation of moisture in the waste ink introduced into the storage space 151 from the ventilation holes 173 to the outside, to prevent the waste ink from solidifying in the storage space 151. Further, as described above, the liquid absorber of the present disclosure itself has an excellent liquid absorption performance, and this absorption performance can be stably maintained for a long period of time. Therefore, the above effects act synergistically, and the ink jet printer 101 provided with the waste ink tank 120 including the ink absorbing material 122 to which the liquid absorber of the present disclosure is applied can maintain the stable permeation absorption performance especially for a long period of time.

Further, in the ink jet printer 101 of the present embodiment, only the waste ink tank 120 can be separately removed from the printer housing 111. Thus, only the waste ink tank 120 contaminated with ink is individually managed and the noncontaminated printer housing 111 can be recycled or reused as it is. In addition, since the waste ink tank 120 is detachable, it is possible to replace only the waste ink tank 120 with a new ink tank without being contaminated with operator's hands in any situation.

When the used waste ink tank 120 of the present embodiment is and disposed, it can be easily disassembled by opening the lid 124, taking out the ink absorbing material 122 in which the waste ink has permeated from the tank body 121, and then removing the valve 174 or the tube 125 from the lid 124. Therefore, it becomes easy to disassemble the used waste ink tank 120 for recycling or reuse of components and materials and classify them by material.

The configuration of the opening/closing valve in which the valve having the opening/closing portion opened by the pressure of introducing the waste ink from the waste ink introduction portion is integrally molded is not limited to the configuration of the opening/closing valve 171, and of course may take various forms.

The opening/closing valve 175 illustrated in FIG. 12 includes, for example, a substantially cylindrical valve seat 177 screwed and fixed in a ventilation hole of a container wall (not illustrated), and a valve 178 seated on the valve seat 177.

The valve seat 177 uses a stepped surface 177a formed on an inner peripheral surface of the cylindrical body as a seating surface for the valve 178. In the valve 178, a disk-shaped valve body 178a whose outer peripheral portion is seated on the stepped surface 177a and a support portion 178b that supports a central portion of the valve body 178a are integrally molded with an elastic member.

As indicated by two-dot chain line in FIG. 12, the valve 178 is elastically deformed in a direction in which the outer peripheral portion of the valve body 178a is separated from the valve seat 177 in accordance with an increase in pressure of the storage space side when the waste ink is introduced. As indicated by an arrow in FIG. 12, the air of the storage space side is released from a gap formed when the valve 178 is elastically deformed to the outside.

Although the preferred embodiments of the present disclosure have been described above, the present disclosure is not limited thereto.

For example, each part constituting the sheet manufacturing apparatus used for manufacturing the liquid absorber can be replaced with an arbitrary component capable of exhibiting the same function. Further, any components may be added.

In the above-described embodiment, the manufacturing apparatus including a heat-fusible resin supply unit that supplies a heat-fusible resin has been described. However, when an absorption layer is formed of a material containing fibers, the heat-fusible resin, and a flame retardant, the manufacturing apparatus may include a heat-fusible resin and flame retardant supply unit that supplies a mixture containing the heat-fusible resin and the flame retardant, instead of the heat-fusible resin supply unit. Further, the manufacturing apparatus may separately include units that supply the heat-fusible resin and the flame retardant independently of each other, that is, the heat-fusible resin supply unit and the flame retardant supply unit. Accordingly, it is possible to suitably change a blending ratio of the heat-fusible resin and the flame retardant and to suitably manufacture various liquid absorbers, according to types of the printing apparatus to which the liquid absorber is applied, for example. Moreover, when an absorption layer containing no heat-fusible resin is formed, it is not necessary to supply the heat-fusible resin.

In the above-described embodiment, a case in which a sheet corresponding to a portion to be an absorption layer is cut, and the sheet is then sandwiched between the first base material and the second base material to join the first base material, the sheet, and the second base material, has been typically described. However, the first base material and the second base material may be joined before the sheet is cut.

In the above-described embodiment, a case in which the first base material and the second base material are joined after a sheet corresponding to a portion to be an absorption layer is manufactured has been typically described. However, for example, the sheet corresponding to a portion to be an absorption layer may be directly formed on a surface of the first base material or second base material.

There is no limitation in that the liquid absorber of the present disclosure is manufactured using the above-described apparatus, but the liquid absorber may be manufactured using any apparatuses.

The printing apparatus of the present disclosure may be any printing apparatus as long as it includes the liquid absorber of the present disclosure, and there is no limitation in that the printing apparatus has the above-described configuration.

Each part constituting the printing apparatus of the present disclosure can be replaced with an arbitrary component capable of exhibiting the same function. Further, any components may be added.

EXAMPLE

Next, specific examples in the present disclosure will be described.

4. Manufacture of Liquid Absorber

The liquid absorber was manufactured as follows.

Example 1

First, a sheet manufacturing apparatus as illustrated in FIG. 2 was prepared.

The used paper as a cellulose fiber source supplied from the fiber supply unit of the sheet manufacturing apparatus was defibrated with a defibration device as a defibration unit.

Next, the heat-fusible resin was supplied from the heat-fusible resin supply unit into a transport path of the used paper defibrated by the defibration unit to obtain a mixture of the cellulose fiber and the heat-fusible resin. As the heat-fusible resin, a polymer blend having a weight ratio of polyester and polyethylene of 50:50 was used.

Next, the mixture was introduced into the mixing portion of the molding unit, and further mixed using gas for stirring.

Next, the mixture was applied onto the first base material that was placed onto the transport unit formed of a nonwoven fabric with air permeability, and sucked through the transport unit, to bring the mixture into close contact with the transport unit and mold the mixture into a sheet shape.

As the first base material and the second base material, a phosphaphenanthrene ring-containing polyester filament nonwoven fabric (manufactured by TOYOBO CO., LTD., trade name: HEIM, basis weight: 30 g/m$^2$) obtained by a spunbonding method was used.

Next, a sheet-shaped molded product was introduced into a fixing portion, and joined by heating and pressurizing under conditions of a treatment temperature of 220° C., a pressure of 4,500 Pa, and a treatment time of 90 seconds, to obtain a liquid absorber.

Thereafter, the liquid absorber was cut with an ultrasonic cutter as a cutting unit to obtain small pieces of the liquid absorber.

The obtained small pieces of the liquid absorber each had a rectangular parallelepiped shape with a length of 15 cm, a width of 5 cm, and a thickness of 10 mm, and had a cellulose fiber contained in an amount of 85% by mass and a heat-fusible resin contained in an amount of 15% by mass.

Example 2

A liquid absorber was manufactured in the same manner as in Example 1, except that the mixture of the heat-fusible resin and the flame retardant was supplied from the heat-fusible resin and flame retardant supply unit by using an apparatus including the heat-fusible resin and flame retardant supply unit, instead of the heat-fusible resin supply unit. As the flame retardant, aluminum hydroxide having an average particle diameter of 8 μm was used.

Example 3

A liquid absorber was manufactured in the same manner as in Example 2, except that 10-(2,5-dihydroxyphenyl)-10-H-9-oxa-10-phosphaphenanthrene-10-oxide having an average particle diameter of 10 μm was used as a flame retardant instead of aluminum hydroxide.

Example 4

A liquid absorber was manufactured in the same manner as in Example 1, except that the nonwoven fabric manufactured as follows was used as the first base material and the second base material.

That is, first, as a filament nonwoven fabric as a parent material containing no flame-retardant component, a polyester filament nonwoven fabric (manufactured by TOYOBO CO., LTD., trade name: ECULE, basis weight: 30 g/m², thickness: 0.2 mm) obtained by a spunbonding method was prepared. A polyester resin flame-retardant binder resin (manufactured by Goo Chemical Co., Ltd., Trade name: Plascoat Z-900, 25% emulsion) containing phosphorus in a polymer skeleton was applied to the filament nonwoven fabric as a parent material and dried, to obtain a flame-retardant filament nonwoven fabric having a coating film of the flame-retardant binder resin formed on a surface of the fibers constituting the parent material. An amount of the polyester resin flame-retardant binder resin applied was adjusted so that a dry mass after applying was 10 parts by mass with respect to 100 parts by mass of the parent material.

Example 5

A liquid absorber was manufactured in the same manner as in Example 1, except that a spunbonded nonwoven fabric manufactured as follows was used as the first base material and the second base material.

That is, first, bis(β-hydroxyethylterephthalate) was subjected to polycondensation to synthesize polyethylene terephthalate having an intrinsic viscosity of 0.73 mPas.

Next, 10 parts by mass of 10-(2,5-dihydroxyphenyl)-10-H-9-oxa-10-phosphaphenanthrene-10-oxide was added to 90 parts by mass of the polyethylene terephthalate, stirring was performed with a mixer, and then kneading was performed with a twin-screw extrusion kneader, to obtain a pellet of polyethylene terephthalate containing the flame retardant. A maximum temperature of the pellet during kneading was 270° C.

Next, the pellet was heated and melted at 270° C. in an extrusion melt spinning machine and extruded and spun from micropores. A filament group of the spun continuous filament fibers was taken up and opened while being stretched with high-speed high-pressure air by an ejector, to form a web by collecting and accumulating the filament group on a surface of a collecting support that is running. The obtained web was introduced between an uneven roll heated to 150° C. and a smooth roll, and a portion corresponding to a convex portion of the uneven roll was fused to obtain a spunbonded nonwoven fabric having a basis weight of 30 g/m². An average particle diameter of 10-(2,5-dihydroxyphenyl)-10-H-9-oxa-10-phosphaphenanthrene-10-oxide contained in the spunbonded nonwoven fabric was 10 μm.

Example 6

A liquid absorber was manufactured in the same manner as in Example 2, except that ammonium polyphosphate having an average particle diameter of 10 μm was used as the flame retardant instead of aluminum hydroxide.

Example 7

A liquid absorber was manufactured in the same manner as in Example 2, except that melamine polyphosphate having an average particle diameter of 4 μm was used as the flame retardant instead of aluminum hydroxide.

Example 8

A liquid absorber was manufactured in the same manner as in Example 2, except that a ratio of the cellulose fiber, the heat-fusible resin, and the flame retardant in the absorption layer was 82:15:3 by a mass ratio.

Example 9

A liquid absorber was manufactured in the same manner as in Example 1, except that the phosphaphenanthrene ring-containing polyester filament nonwoven fabric obtained by a spunbonding method and having a basis weight of 50 g/m² was used as the first base material and the second base material.

Example 10

A liquid absorber was manufactured in the same manner as in Example 1, except that the phosphaphenanthrene ring-containing polyester filament nonwoven fabric obtained by a spunbonding method and having a basis weight of 15 g/m² was used as the first base material and the second base material.

Example 11

A liquid absorber was manufactured in the same manner as in Example 2, except that melamine cyanurate having an average particle diameter of 9 μm was used as the flame retardant instead of aluminum hydroxide.

Comparative Example 1

A liquid absorber was manufactured in the same manner as in Example 1, except that polyester filament nonwoven fabric (manufactured by TOYOBO CO., LTD., trade name: ECULE, basis weight: 30 g/m², thickness: 0.2 mm) having no flame retardant and obtained by a spunbonding method was used as the first base material and the second base material.

Comparative Example 2

A liquid absorber was manufactured in the same manner as in Comparative Example 1, except that the mixture of the heat-fusible resin and the flame retardant was supplied from the heat-fusible resin and flame retardant supply unit by using an apparatus including the heat-fusible resin and flame retardant supply unit, instead of the heat-fusible resin supply unit. As the flame retardant, ammonium polyphosphate having an average particle diameter of 10 μm was used.

Comparative Example 3

A liquid absorber was manufactured in the same manner as in Example 1, except that the mixture of the heat-fusible resin and the flame retardant was supplied from the heat-fusible resin and flame retardant supply unit by using an apparatus including the heat-fusible resin and flame retardant supply unit, instead of the heat-fusible resin supply unit. As the flame retardant, aluminum hydroxide having an average particle diameter of 8 μm was used.

Table 1 summarizes configurations and the like of the liquid absorbers in Examples and Comparative Examples.

TABLE 1

| | FIRST BASE MATERIAL FLAME RETARDANCY IMPARTING METHOD | ABSORPTION LAYER | | | |
|---|---|---|---|---|---|
| | | FIBER | | HEAT-FUSIBLE RESIN | |
| | | TYPE | CONTENT [% BY MASS] | TYPE | CONTENT [% BY MASS] |
| EXAMPLE 1 | POLYMERIZATION | CELLULOSE FIBER | 85 | PET/PE | 15 |
| EXAMPLE 2 | POLYMERIZATION | CELLULOSE FIBER | 80 | PET/PE | 15 |
| EXAMPLE 3 | POLYMERIZATION | CELLULOSE FIBER | 80 | PET/PE | 15 |
| EXAMPLE 4 | APPLYING | CELLULOSE FIBER | 85 | PET/PE | 15 |
| EXAMPLE 5 | KNEADING | CELLULOSE FIBER | 85 | PET/PE | 15 |
| EXAMPLE 6 | POLYMERIZATION | CELLULOSE FIBER | 80 | PET/PE | 15 |
| EXAMPLE 7 | POLYMERIZATION | CELLULOSE FIBER | 80 | PET/PE | 15 |
| EXAMPLE 8 | POLYMERIZATION | CELLULOSE FIBER | 82 | PET/PE | 15 |
| EXAMPLE 9 | POLYMERIZATION | CELLULOSE FIBER | 85 | PET/PE | 15 |
| EXAMPLE 10 | POLYMERIZATION | CELLULOSE FIBER | 85 | PET/PE | 15 |
| EXAMPLE 11 | POLYMERIZATION | CELLULOSE FIBER | 80 | PET/PE | 15 |
| COMPARATIVE EXAMPLE 1 | NONE | CELLULOSE FIBER | 85 | PET/PE | 15 |
| COMPARATIVE EXAMPLE 2 | NONE | CELLULOSE FIBER | 80 | PET/PE | 15 |
| COMPARATIVE EXAMPLE 3 | POLYMERIZATION | CELLULOSE FIBER | 70 | PET/PE | 15 |

| | ABSORPTION LAYER FLAME RETARDANT | | SECOND BASE MATERIAL FLAME RETARDANCY IMPARTING METHOD |
|---|---|---|---|
| | TYPE | CONTENT [% BY MASS] | |
| EXAMPLE 1 | — | 0 | POLYMERIZATION |
| EXAMPLE 2 | ALUMINUM HYDROXIDE | 5 | POLYMERIZATION |
| EXAMPLE 3 | 10-(2,5-DIHYDROXYPHENYL)-10-H-9-OXA-10-PHOSPHAPHENANTHRENE-10-OXIDE | 5 | POLYMERIZATION |
| EXAMPLE 4 | — | 0 | APPLYING |
| EXAMPLE 5 | — | 0 | KNEADING |
| EXAMPLE 6 | AMMONIUM POLYPHOSPHATE | 5 | POLYMERIZATION |
| EXAMPLE 7 | MELAMINE POLYPHOSPHATE | 5 | POLYMERIZATION |
| EXAMPLE 8 | ALUMINUM HYDROXIDE | 3 | POLYMERIZATION |
| EXAMPLE 9 | — | 0 | POLYMERIZATION |
| EXAMPLE 10 | — | 0 | POLYMERIZATION |
| EXAMPLE 11 | MELAMINE CYANURATE | 5 | POLYMERIZATION |
| COMPARATIVE EXAMPLE 1 | — | 0 | NONE |
| COMPARATIVE EXAMPLE 2 | AMMONIUM POLYPHOSPHATE | 5 | NONE |
| COMPARATIVE EXAMPLE 3 | ALUMINUM HYDROXIDE | 15 | POLYMERIZATION |

5. Evaluation

The liquid absorbers obtained as described above were evaluated as follows.

5-1. Ink Permeability

First, mixed pigment ink for evaluation was prepared as follows.

That is, the mixed pigment ink for evaluation was obtained by preparing each of black ink, yellow ink, magenta ink, and cyan ink, mixing equal masses of the black ink, the yellow ink, the magenta ink, and the cyan ink, and tightly sealing the mixture in the container to allow it to stand for 14 days at 25° C. The black ink consists of 5% by mass of self-dispersible carbon black (CW-1, manufactured by Orient Chemical Industries Ltd) (volume average particle diameter: 150 nm), 3% by mass of resin emulsion (styrene-acrylic acid), 0.5% by mass of acetylene-based surfactant (Olfine E1010), 5% by mass of glycerin, 2% by mass of 2-pyrrolidone, 2% by mass of 1,2-hexanediol, and residual water; the yellow ink consists of 3% by mass of a coloring material coated with Pigment Yellow 74 with a resin, 3% by mass of resin emulsion (styrene-acrylic acid), 0.3% by mass of acetylene-based surfactant (Olfine E1010), 3% by mass of glycerin, 2% by mass of 2-pyrrolidone, 2% by mass of 1,2-hexanediol, and residual water; the magenta ink consists of 3% by mass of a coloring material coated with Pigment Red 122 with a resin, 3% by mass of resin emulsion (styrene-acrylic acid), 0.3% by mass of acetylene-based surfactant (Olfine E1010), 3% by mass of glycerin, 2% by mass of 2-pyrrolidone, 2% by mass of 1,2-hexanediol, and residual water; and the cyan ink consists of 3% by mass of a coloring material coated with Pigment Blue 15:3 with a resin, 3% by mass of resin emulsion (styrene-acrylic acid), 0.3% by mass of acetylene-based surfactant: (Olfine E1010), 3% by mass of glycerin, 2% by mass of 2-pyrrolidone, 2% by mass of 1,2-hexanediol, and residual water.

As the resin for coating Pigment Yellow 74, the resin for coating Pigment Red 122, and the resin for coating Pigment Blue 15:3, a water-insoluble polymer synthesized as follows was used. That is, 20 parts by mass of methyl ethyl ketone as an organic solvent, 0.03 parts by mass of 2-mercaptoethanol as a polymerization chain transfer agent, 1.2 parts by mass of 2,2'-azobis(2,4-dimethylvaleronitrile) as a polymerization initiator, 20 parts by mass of methacrylic acid, 45 parts by mass of styrene monomer, 5 parts by mass of polyethylene glycol monomethacrylate (PO=9), 10 parts by mass of polyethylene glycol/propylene glycol monomethacrylate (EO=5, PO=7), and 20 parts by mass of styrene macromer (manufactured by TOAGOSEI CO., LTD., trade name: AS-6S, number average molecular weight: 6,000, polymerizable functional group: methacryloyloxy group), were placed in a reaction vessel. Thereafter, the inside of the reaction vessel was sufficiently replaced with nitrogen gas, polymerization was performed under stirring at 75° C., and then 0.9 parts by mass of 2,2'-azobis(2,4-dimethylvaleronitrile) dissolved in 40 parts by mass of methyl ethyl ketone was added to 100 parts by mass of the polymerizable component, and the mixture was aged at 80° C. for one hour, thereby obtaining a water-insoluble polymer solution, and the water-insoluble polymer solution was dried under reduced pressure, thereby obtaining a water-insoluble polymer. However, in the above description, PO indicates propylene oxide and EO indicates ethylene oxide.

Pigment particles used as parent materials, that is, Pigment Yellow 74, Pigment Red 122, and Pigment Blue 15:3, were coated with the water-insoluble polymer as follows. That is, 5 parts by mass of the water-insoluble polymer was dissolved in 15 parts by mass of methyl ethyl ketone, the polymer was neutralized with an aqueous sodium hydroxide solution, and 15 parts by mass of a pigment as a parent material was added, and kneading was performed while adding water. Thereafter, 100 parts by mass of ion-exchanged water was added to the obtained kneaded product and stirred, and the methyl ethyl ketone was then removed at 60° C. under reduced pressure, and a part of the water was further removed to obtain a water dispersion (solid concentration: 20% by mass) of the coloring material coated with the water-insoluble polymer.

The resin emulsion (styrene-acrylic acid) was obtained as follows. That is, 800 g of ion-exchanged water and 1 g of sodium lauryl sulfate were charged into a reaction vessel including a stirrer, a reflux condenser, a dropping device, and a thermometer, and a temperature of the reaction vessel was raised to 75° C. with nitrogen substitution under stirring. The internal temperature was kept at 75° C., 6 g of potassium persulfate as a polymerization initiator was added to and dissolved into the resultant, an emulsified product prepared by adding 20 g of acrylamide, 600 g of methyl methacrylate, 215 g of butyl acrylate, 30 g of methacrylic acid, and 5 g of triethylene glycol diacrylate to 450 g of ion-exchanged water and 2 g of sodium lauryl sulfate in advance under stirring was continuously added dropwise for five hours. After completion of the dropwise, aging was performed for three hours. The obtained aqueous emulsion was then cooled to room temperature, and added with the ion-exchanged water and the aqueous sodium hydroxide solution to adjust the mixture to 30% by mass of solid content and pH 8, thereby obtaining a resin emulsion (styrene-acrylic acid).

Ink permeability for the liquid absorbers manufactured in Examples and Comparative Examples was evaluated as follows using the mixed pigment ink obtained as described above.

First, the liquid absorbers manufactured in Examples and Comparative Examples were placed in a container filled with the mixed pigment ink at a lower end portion of the liquid absorber so that sides of 200 mm were in a vertical direction, and allowed to stand. Here, a liquid level of the mixed pigment ink in the container was located at 15 mm from the lower end of the liquid absorber.

When left to stand for two hours, a height at which the pigment ink penetrated from the lower end of the liquid absorber was measured and evaluated according to the following criteria. It can be said that the larger the penetration height, the better the ink permeability.

A: Penetration height is 120 mm or more.

B: Penetration height is 100 mm or more and less than 120 mm.

C: Penetration height is less than 100 mm.

5-2. Flame Retardancy

A burning rate of the liquid absorbers manufactured in Examples and Comparative Examples was determined by a method based on JIS K6400-6. That is, for the liquid absorbers manufactured in Examples and Comparative Examples, one end thereof was grasped so that sides of 15 cm was in a horizontal direction, and the other end was indirectly flamed with a 38 mm flame for 60 seconds, and a burning rate of 100 mm between marked lines was determined to evaluate the flame retardancy according to the following criteria. It can be said that the smaller the burning rate, the better the flame retardancy.

A: Burning rate is lower than 5 mm/min.

B: Burning rate is 5 mm/min or higher.

5-3. Ink Aggregation Property

An ink aggregation property of the liquid absorbers manufactured in Examples and Comparative Examples was evaluated as follows. That is, 10 g of the mixed pigment ink was placed in a container with a lid that could be sealed, and 1 g of the liquid absorber was immersed in the container, sealed tightly, and heated at 60° C. for 72 hours. Thereafter, the container was opened and visually observed, and occurrence of ink aggregation in the liquid absorber was evaluated according to the following criteria.

A: No aggregation is observed.

B: Aggregation is observed on the surface of the liquid absorber.

C: The entire ink is gelled.

These results are shown in Table 2.

TABLE 2

|  | INK PERMEABILITY | FLAME RETARDANCY | INK AGGREGATION PROPERTY |
|---|---|---|---|
| EXAMPLE 1 | A | B | A |
| EXAMPLE 2 | B | A | A |
| EXAMPLE 3 | A | A | A |
| EXAMPLE 4 | A | B | A |
| EXAMPLE 5 | A | B | A |
| EXAMPLE 6 | B | A | B |
| EXAMPLE 7 | A | A | B |
| EXAMPLE 8 | A | B | A |
| EXAMPLE 9 | A | A | A |
| EXAMPLE 10 | A | B | A |
| EXAMPLE 11 | B | A | A |
| COMPARATIVE EXAMPLE 1 | A | B | A |
| COMPARATIVE EXAMPLE 2 | C | B | C |
| COMPARATIVE EXAMPLE 3 | C | A | B |

As is clear from Table 2, the present disclosure could provide a liquid absorber having excellent ink permeability and flame retardancy. In addition, it was confirmed in the present disclosure that the ink aggregation was effectively prevented. From this result, it can be said that a liquid absorption performance can be stably improved for a long period of time. On the other hand, in Comparative Examples, satisfactory results were not obtained.

What is claimed is:

1. A liquid absorber comprising:
a first base material;
a second base material; and
an absorption layer provided between the first base material and the second base material, wherein
the first base material and the second base material both contain a flame-retardant filament nonwoven fabric, and
a content of a flame retardant in the absorption layer is less than 7% by mass.

2. The liquid absorber according to claim 1, wherein the filament nonwoven fabric is a spunbonded nonwoven fabric.

3. The liquid absorber according to claim 1, wherein the flame-retardant filament nonwoven fabric contains a fiber formed of a polymer containing a flame-retardant monomer component.

4. The liquid absorber according to claim 3, wherein the flame-retardant monomer component is a phosphorus-containing compound.

5. The liquid absorber according to claim 1, wherein the flame-retardant filament nonwoven fabric is obtained by applying the flame retardant to a surface of the filament nonwoven fabric.

6. The liquid absorber according to claim 1, wherein the flame-retardant filament nonwoven fabric is obtained by molding a kneaded product containing a resin material and the flame retardant.

7. The liquid absorber according to claim 1, wherein the absorption layer contains a cellulose fiber and a heat-fusible resin.

8. The liquid absorber according to claim 1, wherein the absorption layer contains a hydroxide as the flame retardant.

9. The liquid absorber according to claim 1, wherein the liquid absorber is used for absorbing ink.

10. The liquid absorber according to claim 1, wherein the liquid absorber is used for absorbing pigment ink containing a pigment.

11. A printing apparatus comprising:
the liquid absorber according to claim 1.

* * * * *